US008453159B2

(12) United States Patent
Appelbaum et al.

(10) Patent No.: US 8,453,159 B2
(45) Date of Patent: May 28, 2013

(54) WORKSPACE SYSTEM AND METHOD FOR MONITORING INFORMATION EVENTS

(75) Inventors: Michael S. Appelbaum, Washington, DC (US); Jeffrey H. Garvett, Washington, DC (US); Christopher Bradley, Sterling, VA (US); Karl Ginter, Beltsville, MD (US); Michael Bartman, Potomac, MD (US)

(73) Assignee: Informatica Corporation, Redwood City, CA (US)

( * ) Notice: Subject to any disclaimer, the term of this patent is extended or adjusted under 35 U.S.C. 154(b) by 1143 days.

(21) Appl. No.: 12/130,654

(22) Filed: May 30, 2008

(65) Prior Publication Data

US 2011/0167433 A1 Jul. 7, 2011

Related U.S. Application Data

(60) Provisional application No. 60/924,801, filed on May 31, 2007.

(51) Int. Cl.
 *G06F 13/00* (2006.01)
 *G06F 15/16* (2006.01)
 *G06F 17/00* (2006.01)

(52) U.S. Cl.
 USPC .............................. 719/312; 709/229; 706/47

(58) Field of Classification Search
 None
 See application file for complete search history.

(56) References Cited

U.S. PATENT DOCUMENTS

| | | | |
|---|---|---|---|
| 5,870,605 A | | 2/1999 | Bracho et al. |
| 6,289,385 B1* | | 9/2001 | Whipple et al. ............. 709/229 |
| 6,353,851 B1 | | 3/2002 | Anupam et al. |
| 6,490,574 B1 | | 12/2002 | Bennett et al. |
| 6,564,246 B1 | | 5/2003 | Varma et al. |
| 6,941,465 B1 | | 9/2005 | Palekar et al. |
| 7,020,869 B2 | | 3/2006 | Abrari et al. |
| 7,027,463 B2* | | 4/2006 | Mathew et al. ............... 370/463 |
| 7,290,278 B2 | | 10/2007 | Cahill et al. |
| 7,428,723 B2* | | 9/2008 | Greene et al. .................. 717/103 |
| 7,634,539 B2* | | 12/2009 | Schwarz et al. .............. 709/204 |
| 2002/0091533 A1 | | 7/2002 | Ims et al. |
| 2004/0204906 A1 | | 10/2004 | Lambert et al. ............... 702/181 |
| 2004/0250261 A1 | | 12/2004 | Huibregtse .................... 719/318 |
| 2006/0150022 A1 | | 7/2006 | Malik |
| 2009/0013043 A1* | | 1/2009 | Tan ............................... 709/205 |

OTHER PUBLICATIONS

Agent Logic, Inc., "FAQ," Feb. 11, 2006, three pages. [Online] [Retrieved Sep. 28, 2011] Retrieved from the Internet <URL:http://web.archive.org/web/20060211122241/http://agentlogic.com/products/frequently_asked_questions.php#7.>
Agent Logic, Inc., "Solution Brief: Real-Time Alerting and Event Awareness: Enable Disparate Collection Management Processes with Real-time Alerts and Event Awareness," 2004, five pages.
Australian Government—IP Australia, Examiner's First Report, Australian Patent Application No. 2008256623, Apr. 27, 2012, 2 pages.
Friedman et al., "Problem Solving, Abstractions, and Design Using C++," 1997, second edition, pp. 168- 169 and 196-199.
Patent Cooperation Treaty, International Preliminary Report on Patentability, International Patent Application No. PCT/US2008/065374, Dec. 1, 2009, 7 pages.

* cited by examiner

*Primary Examiner* — S. Sough
*Assistant Examiner* — Phuong Hoang
(74) *Attorney, Agent, or Firm* — Fenwick & West LLP

(57) ABSTRACT

A system and method for monitoring information events partitions sets of information and processing steps into one or more workspaces. The workspaces include sharable portable specifications for implementing event monitoring by a plurality of users or computer systems. Workspaces may be bindable computing resources to establish controls between the computing resources and the workspaces.

15 Claims, 9 Drawing Sheets

WORKSPACE SYSTEM AND METHOD FOR MONITORING INFORMATION EVENTS

CROSS REFERENCE TO RELATED U.S. PATENT APPLICATION

The present application claims priority under 55 U.S.C. §119(e) to provisional U.S. Patent Application Ser. No. 60/924,801 filed May 31, 2007, which is incorporated herein by reference in its entirety and for all purposes.

COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2008, Agent Logic, Inc.

BACKGROUND

This invention relates to systems and techniques for monitoring information events from various data sources, and further relates to systems and techniques for specifying shared event sources, constructing distributed event processing systems, and techniques and systems for managing event processing rules and specifications.

Business and government analysts are experiencing an information onslaught. The volume of information is increasing in internal systems, in publicly accessible information sources, and across the Internet. While this information flow is valuable, it is becoming increasingly difficult to sort and filter, to determine patterns and trends in the information flow, and to present the resulting materials in a form usable by one or more end users. Operational imperatives such as situational awareness, cost containment, risk mitigation, and growth require timely detection of, and response to, key business events. Organizations must be able to effectively respond to opportunities and threats represented by the information continually occurring across disparate sources of information that relate to their missions.

Information flows can be considered as a sequence of individual events, each of which must be collected, processed, evaluated, as part of an information processing system. Individual events, such as a new order, a 911 call, a customer service request, a geographic position update, or an updated investigative report represent the foundation of new and changing data throughout an organization that must be continually monitored to identify opportunities and threats. Previous systems have employed news feeds, databases, and search engines to receive, process, and index data as it becomes available. However, cataloging information into databases and search engines takes time and computing resources. Meanwhile, the user must periodically query the data system for new results that match their search criteria. One manager estimated that his analysts spend the first 1-2 hours of each workday checking existing databases and search engines for new information and manually further processing the information into actionable events. Complex events, that include related individual events, often go undetected due to information overload or improper filtering and assessment. Automated systems that automatically correlate events, particularly events that are separated by a time interval of days or weeks, often fall back on storing information in a database, manually or automatically querying the database for known event patterns, and then re-analyzing the information retrieved. These processes are highly inefficient and are not scalable.

Raw information becomes actionable events through a defined series of information processes and/or processing steps. Existing systems provide for static processing systems using IT-defined, process-driven workflows that often add time to the processing. Mechanisms for access to raw and processed information, the processing steps and workflow definitions, and resulting assessment and actions have historically been neglected. Extant information monitoring systems often rely on monolithic architectures over continuously connected networks in order to process information. These systems suffer from significant drawbacks. First, these systems are often statically configured, requiring users with appropriate permissions to pre-compute the amount of processing power and processing resources that must be made available for each step of system's processing. Thus, these types of systems do not scale well as information loads, resources, staffing, or processing requirements change. Changing of information and data sources, information flow rates, available processing power, the number and locations of staffing seats (including workstation configurations, access, and provisioning with data sources, processing recipes and the like) are all aspects of scaling. Some information resources exhibit "bursty" volume characteristics, in which the information volume often increases by orders of magnitude during times of interest. Similarly, staffing and resources applied to management of events often dramatically increase during times of interest. Often, time is not available to make IT-centric workflow, system provisioning, and/or changes, much less to provide for the testing and rollout of new IT-based workflows and processing recipes. Thus, the management of the information, resources, and staff during times of substantive change is a significant challenge in today's environment. Additionally, the organization and provisioning of resources is often statically performed by external (e.g. IT) staff, and requires significant effort to shift resources and services to use alternate processing resources, workflows, and processing recipes. For mission critical applications, disaster and outage management paradigms further require that large monolithic systems be replicated at great cost.

Furthermore, present system architectures lack effective ways to share and control data about information sources, data management processes and recipes, and information filtering techniques/processing recipes. For example, Microsoft Windows products provide an interface for ODBC drivers in which an information database connection can be loaded onto a user's machine, but which provides no other controls than the connection string. Furthermore, ODBC technologies support only local and network connected databases, and are not useful for newer distribution mechanisms such as web-based information sources and RSS feeds. For example, RSS feed readers store URLs and authorization information to access data feeds, but do not provide continued processing capabilities. Other products, such as web search engines or bookmark collections, provide stored URLs to web-based information services, but do not provide an easy mechanism to manage authorization credentials associated with each URL so that several users can access the information without extensive or repetitive configuration efforts, nor do they permit definition of additional process steps required to obtain and pre-process content referenced by the URLs. Other types of information sources have similar issues, and do not provide a robust, sharable solution for handling these aspects of information processing.

Additionally, extant systems and methods do not provide mechanisms for successful information processing and filtering recipes and techniques to be captured in a transportable manner and subsequently used within a distributed environment. Raw information is obtained, pre-processed, and assessed as part of a process that transforms the information into an actionable event. The mechanisms for obtaining the information, pre-processing it, and assessing the information are traditionally hard coded into information processing systems, and are thus not easily distributable or sharable between users, sites in a distributed system, or different systems or instances of a system. Current systems generally rely on individuals to obtain, process, and assess information feeds independently. This results in significant duplication of processing efforts at system, machine and personnel levels.

Specifically, the workflows, rules, and processing recipes for processing information are generally hard coded into present day information system, or are configured by specialized IT staff. The information systems often impose restrictions on how, where, and by whom the rules can be changed, and are not structured to support reuse of rules and processing recipes, nor the sharing of user developed rules, recipes, and workflows.

Finally, current information processing systems do not provide for isolation of multiple instances of workflows, rules, and recipes from each other. Extant systems provide large, monolithic processing mechanisms that focus on processing speed and not information separation. Information separation is important in some businesses. Furthermore, systems that do not provide robust information separation can exhibit unexpected information processing behaviors because of interactions between two or more processing rules. The information "side effects" cause system instability, unreliable processing, and sometimes work stoppage.

What is needed is a system that permits for the management of user-defined resources, processing recipes, and subsequent event management workflows within a scalable, distributed framework for connecting to and receiving information from a plurality of resources, processing this information, and producing actionable events which are effective to provide real-time event detection, analysis, and response in highly complex and secure environments.

SUMMARY

The present invention provides a robust solution for event correlation and monitoring applicable in a variety of fields. In particular, the present invention provides a variety of user-configurable methods for interfacing with data sources, recognizing and selecting events, and providing actions based upon those events.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like items.

DETAILED DESCRIPTION

1 Overview

A distributed information and processing system and architecture ("the system") is described that processes information across disparate information sources, such as data streams, sensors, communications systems, legacy systems, databases, and flat files, produces and processes events based upon information from these information sources, and initiates specified actions as a result of this event processing. The system creates "event objects" as information flows through one or more information systems, either by polling underlying data systems or by receiving specific notifications. Event objects are describe at least one aspect of a detected event and optionally describe meta-data associated with the event, such as the time at which it was detected, the source of the information used, the version of the software used to process the detection, etc.

When the system detects an event, or a combination of events, that match conditions specified in a rule, it executes one or more corresponding responses (actions). Events that do not match any rule do not result in responses being executed. This mechanism removes unwanted, insignificant, or not yet significant events from further immediate processing, permitting available computing resources to be focused on those events that are of interest, and the execution of responses to them. Events, or information derived from them, can be retained by the system when one or more rules specify this, and be used in the future evaluation of rules, thus providing the system with a "memory" and the ability to detect combinations of events over time. Events which are not significant when first detected later can be found significant in combination with other events that occur at a later time. For example, one failed attempt at providing a valid password for access to a user account on a computer is not significant, but a large number of failed attempts over a short time span might be.

Many types of event responses can be initiated using a variety of mechanisms well understood by those skilled in the art, such as email instant message alerts, Web Service and business process activation, event enrichment responses to collect additional information about the event, and browser alerts through such mechanisms as Agent Logic's (Herndon, Va.) Real-Time Browser™, and instant GIS/Link Analysis tool updates. Responses, such as process initiation and alerts, can be either triggered in real time, or processed as a group at specific points in time.

Figure 1:
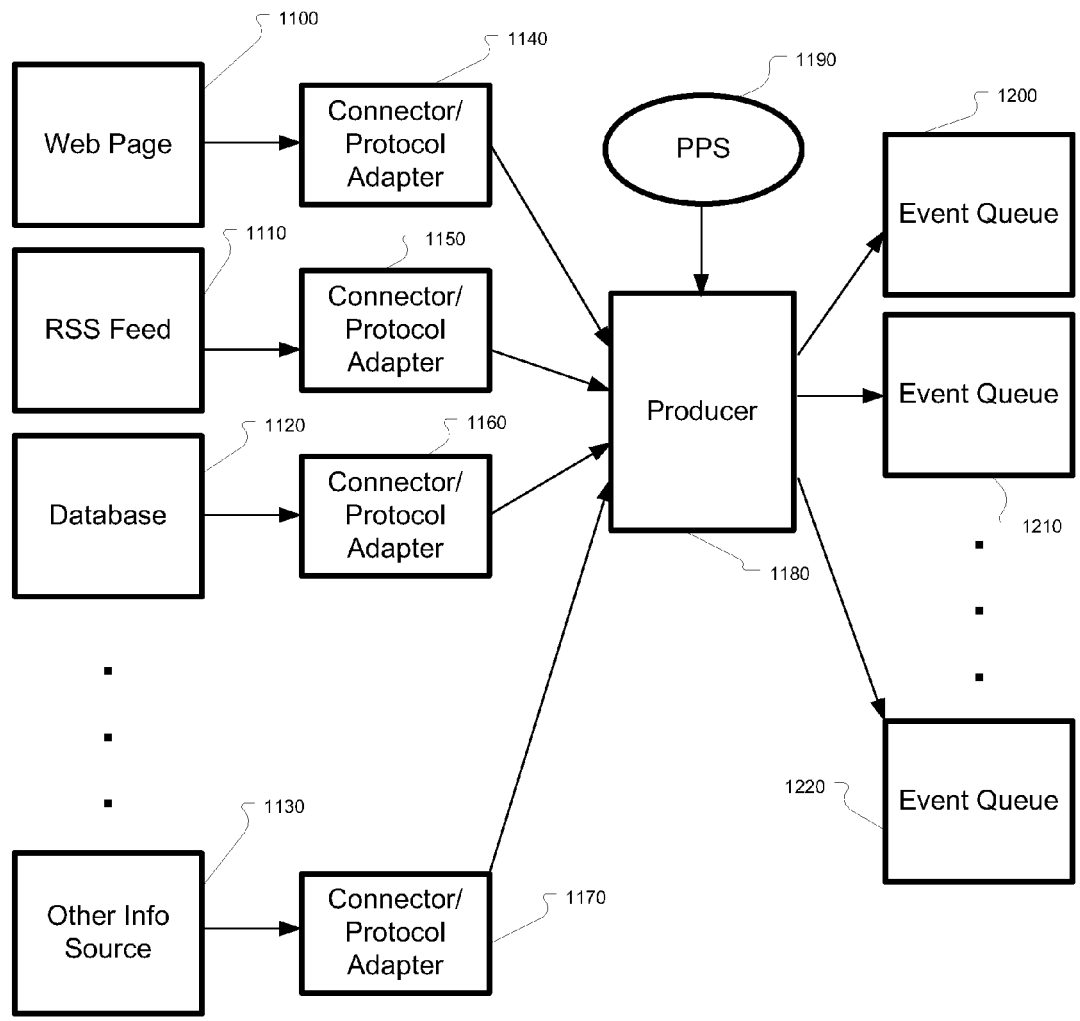
FIG. 1 shows a logical representation of the components involved in an input stage of the present invention.

An aspect of some embodiments of the present invention is the ability to generate events based on information obtained from commonly defined information and data sources, the processing required to determine the relevance of piece of information and/or data to one or more specified event or set of events, and initiate responses. A further aspect is to make access to these information sources, the processing steps required, and the actions to take in response to the information and/or data processing available to many users of the system without involving IT personnel. In some embodiments both individual and complex events across many different systems are simultaneously detected and responded to. As shown in FIG. 1, a plurality of information sources (1100, 1110, 1120, & 1130) can be input through the use of a plurality of Connector/Protocol Adapters (1140, 1150, 1160, & 1170) that incorporate necessary protocol knowledge to deal with each type of information source as well as an ability to convert the information obtained from each information source into a format understood by the system's producer services. The said converted information is passed to a producer service (1180), that uses rules, pre-processing specifications and/or scripts obtained from a Portable Producer Specification (PPS) (1190) to evaluate the said converted information and to generate event objects from it as specified by the said rules, pre-processing specifications and/or scripts and place said event objects into appropriate event queues (1200, 1210 & 1220) as determined by rules, pre-processing specifications, scripts or other materials incorporated into the PPS. Event objects in event queues are further processed by other aspects of the system as described below. Multiple producer services, and other applications, that are part of the system, running within a single instance of embodiments of the present invention can be managed separately so that any number of systems and users can leverage event-processing capabilities for a variety of isolated applications, all of which are running concurrently.

One advantage of the enterprise-wide event management system and architecture described herein is that it provides for real-time event detection, analysis, and response in highly complex and secure environments. The flexible many-to-many event processing flow mechanisms support the partitioning of information and processing by security domain, workload, user, information source, event queue, priority, department, computing resources or other parameter or parameters. Partitioning is achieved through mechanisms such as "workspaces", providing access and usage controls on all system objects, and by restrictions on the use of computing resources. Computing resources comprise data processing hardware, such as CPUs, memory, communication means and data storage devices, and/or permission to make use of these, which are useful for execution of event processing flows. Each enterprise-wide event management system is configurable to enforce any desired level of information segregation, so both users and information can be logically and physically separated in order to ensure processing integrity. Unlike other systems of this type, the described architecture provides for rapid deployment and scaling of each component, distribution of processing while maintaining data and processing partitioning, and for the organic growth of rules and rules sets without required intervention by IT staff.

Figure 2:
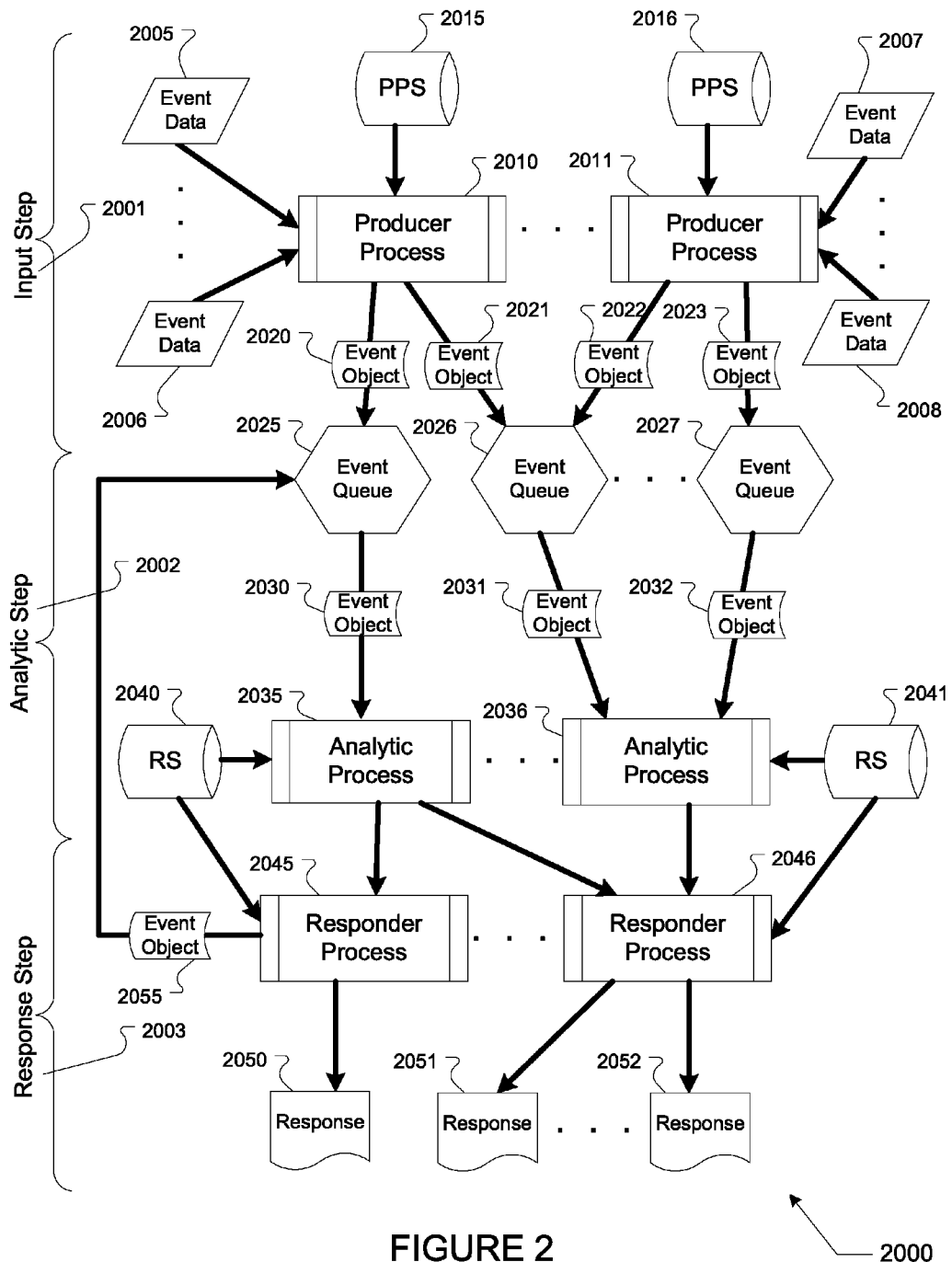
FIG. 2 shows a process flow diagram illustrating event processing steps in accordance with an illustrative embodiment of the present invention.

As shown in FIG. 2, the exemplary system provides for shared, and portable, complex, user-specified, rule-based calculations and formulas for the processing of information and events. A sequence of event processing steps (2001, 2002, & 2003), effective to produce a desired outcome from event processing, is known herein as an "event processing flow" (2000). Event processing steps (2001, 2002, & 2003) are a combination of rules, processes, event definitions and responses effective to receive information (2005, 2006, 2007, & 2008), process said information, and produce one or more event objects (2020, 2021, 2022, 2023, 2030, 2031, 2032 & 2055) and/or responses (actions) (2050, 2051, & 2052) as a result of said processing. The specific components of the event processing flow (2000) (e.g. Portable Producer Specifications (PPSs) (2015 & 2016), producer services (2010 & 2011), event queues (2025, 2026, & 2027), analytic services (2035 & 2036), rule specifications (RSs) (2040 & 2041), responder processes (2045 & 2046), etc.) effective to define (and subsequently process) a complete aspect of a distributed event processing flow (2000), such as the implementation of a specific instance of an event processing step (2001, 2002, or 2003), are known herein as "event processing nodes". Event processing nodes can be located on a single computing system, or distributed across any number of computing systems, consistent with computing resource restrictions configured into the system to maintain desired partitioning of information and processing. Computing system are typically computer systems of common manufacture, such as servers, desktops, mainframes, embedded systems, as well as mobile computing devices such as laptops and cell phones. Specifically, and without limitation, computing systems can include single and multi-processor computers, as well as multi-core processor equipped computers. Computing systems can similarly be equipped with any of the peripherals and communications technologies used in current-day computers.

The system provides for the definition, use, sharing and transporting of information source definitions, known as Portable Producer Specifications (PPSs). These comprise information such as procedures and specifications for procedures necessary to access and use various information sources, such as web pages, RSS feeds, and databases, as well as procedures for pre-processing the information obtained from said sources into event objects as used by the system, and placing said event objects into appropriate event queues. PPSs are described in more detail below.

Each defined PPS used in the system can be specified by rule specifications (RSs) created or used by each user. Furthermore, each user can create such additional PPSs as they require, using templates and wizards (for novice users), or by directly creating PPSs through command or other user interface mechanisms as will be understood by those having skill in the art.

Rules define the relationships between events (as represented by event objects) and responses. Each user can create such rules as they deem appropriate using templates and wizards (for novice users), by directly writing rules in a rules language, or by commands or other user interface mechanisms as will be apparent to those with skill in the art. Templates are partially defined rules within which the user is required to complete one or more aspects of the rule before use. A wizard is a software application that guides a user through coding a rule, or completing a template. Templates can also be used for more complex structures, such as defined processing flows.

The system provides for the definition, use, sharing and transporting of rule specifications (RSs). An RS is an object containing a definition for a single rule and all parameters associated with the rule. The parameters associated with the rule are implementation dependent, but can include such things as a rule ID, access restrictions for the rule, identification of the rule's author, etc.

A collection of PPSs, related event queue descriptions, and RSs that is sufficient to perform at least one event-processing step, when combined with appropriate services, such as producer or analytic services, is referred to as a "recipe". A recipe defines information sources, the event queues that event objects generated from these information sources are placed into, and the rules that operate on the said event objects to generate the responses specified by the rules.

1.1 Portable Producer Specifications

Figure 3:
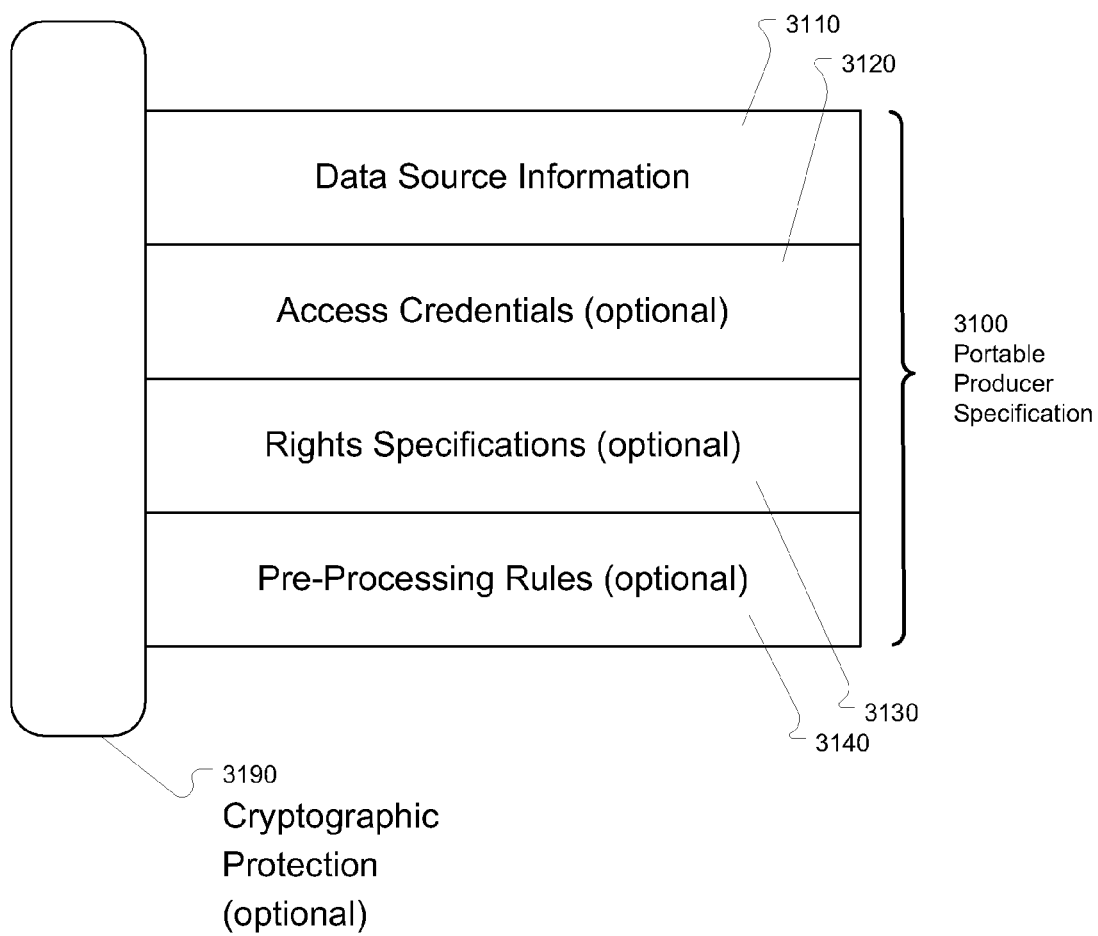
FIG. 3 shows a schematic representation of a Portable Producer Specification (PPS) in accordance with one embodiment of the present invention.
Figure 4:
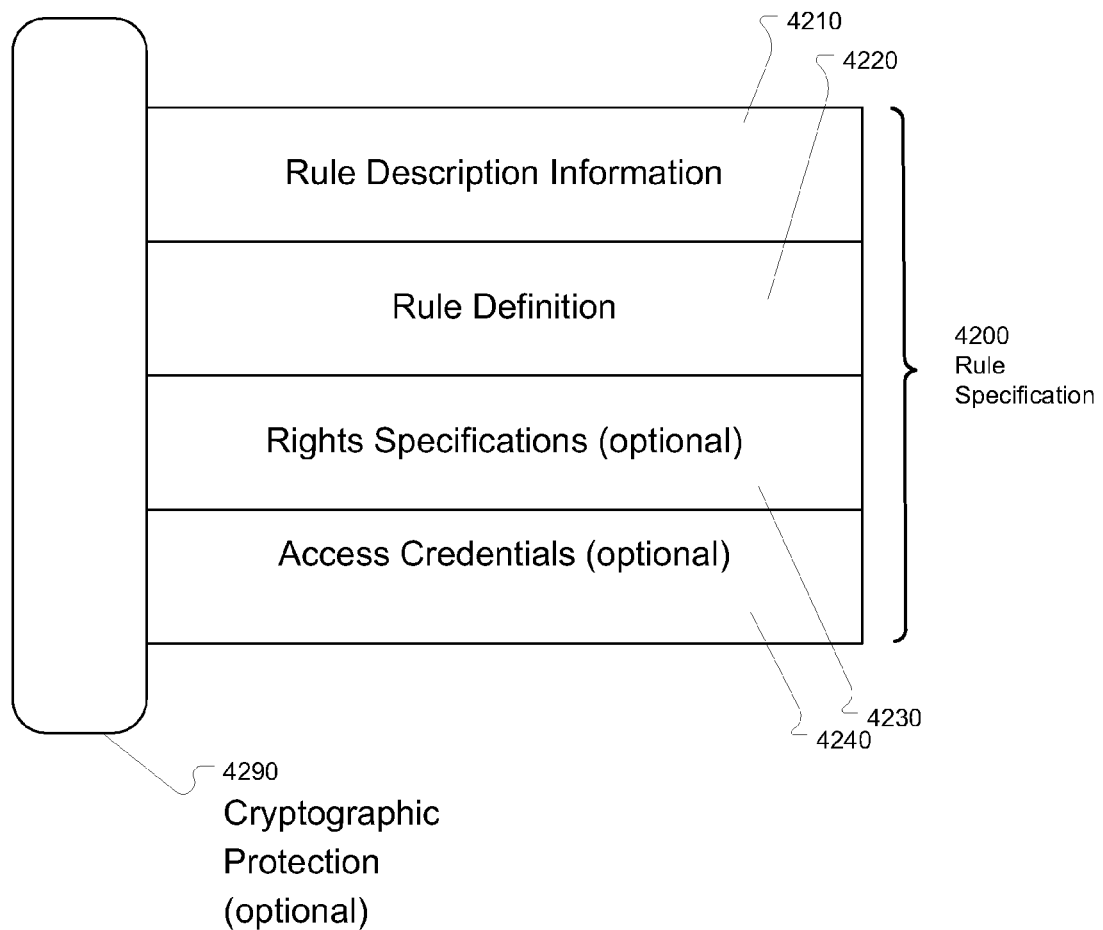
FIG. 4 shows an exemplary Rule Specification (RS) object within the scope of the present invention.

FIG. 3 shows an exemplary Portable Producer Specification (PPS) object within the scope of the present invention. A PPS is an object that can be provided as a data file, database entry, directory entry, or in another machine-readable format that can be used by a producer service to configure its interaction with a data source. PPSs can be shared between users, workspaces, or systems or exported and transported between users, workspaces, systems or instances of the invention and can optionally be included in RuleBooks to simplify sharing and transporting sets of PPSs. The PPS (3100) includes one or more elements, including data source information (3110), optional access credentials (3120), optional rights specifications (3130), and optional pre-processing rules (3140). These elements can be optionally cryptographically protected (3190) for integrity (e.g. hash/digital signature) and/or privacy (e.g. encryption). A PPS can be encoded using any representation-appropriate encoding scheme, such as rows in a database table, as ASCII tag-value text in a properties file, or as an XML document.

Data source information (3110) includes one or more information elements that describe or inform the user, or producer service, about the data source, including name and description, source data type, contact information for an assistance provider (e.g. a help desk or system manager), account numbers, owning user, group or system, and related materials. Data source information (3110) also can include elements that form an association between a producer service and the system, including a unique identifier or other ID of the producer service, authorization credentials required to use the information source, or other security and configuration indicia that can be used by the system to properly configure and authenticate the use of the information source, the producer service, and the system. The specification of the precise information elements included in this group of elements is implementation dependant.

Access credentials (3120) includes information elements that provide machine-readable information that can be used by a producer service to gain access to the information source. Elements within this section can include a database access string, a URI, and/or a predefined query to define the information source location and/or mechanisms required to access the information source. If not encoded within the database access string or URI, the access credentials (3120) can also include the method or protocol to be used to access the information service, such as specification of a connector/protocol adapter to use with the particular information source. Additionally, the access credentials (3120) can contain authentication and authorization materials, such as user id, user name, password, digital certificate, or other indicia of authority to receive information from the information source. Other components can be added to the access credential section on a producer service by producer service basis.

Rights components (3130) is an optional specification that can include specifications of rights or tags to attach to information received from the information source. Alternatively, rights components (3130) can include a rights specification, such as a rights specification defined using a rights specification language such as XrML.

Pre-processing rules (3140) are an optional set of components that provide rules for pre-processing information obtained from an information source, such as an RSS feed or email, for example, prior to passing the information to an analytics section, such as extracting and formatting information into the format required by an event specification, or the addition of meta-data, such as the time of collection, the source the information was collected from, the ID or software version of the producer service, or other information about the collected information or the mechanism used to collect it. In some embodiments, the pre-processing rules can include the actual rule specification itself, while in other embodiments, the pre-processing rules can comprise a reference to one or more rules specifications stored elsewhere. Pre-processing rules specifications can also comprise specification of the event queue, or event queues, that are available to receive events generated as a result of pre-processing the source information, and what criteria are used to assign events to particular event queues. Pre-processing rules specifications can optionally comprise script or procedure information that permits arbitrary processing as a part of event processing.

PPSs can optionally be encrypted for privacy or to enforce security partitioning, or as a form of digital signature to certify origin.

One aspect of the invention is that service definitions are both portable and sharable. Sharable service definitions support the sharing of service definitions for producer, analytics, and responders as RSs are shared. Portable service definitions permit service definitions to be moved between instances of the present invention, and for an appropriate service to be instantiated on the new instance using the original service definition. The term portable as used throughout the present specification generally means transportable, but may also be used to describe objects, systems, data structures or other entities that are shareable without necessarily being transportable. An advantage of using PPS's is that PPS's can be shared between users of an instance of a system of the present invention, can be shared between disparate instances of the present invention, and can even be made available on other systems, such as storefronts and within application provisioning systems.

Another advantage of using PPS's is that PPS's provide a business a means to control access to information sources, while at the same time, maintaining the confidentially of the information and data source authentication materials. Coupled with controls over access and use, the arrangement of using PPS's permits control over access to materials at the same time facilitating sharing of common resources and the management of common accesses.

One benefit of having sharable and portable PPSs is that they ease the burden of each individual user's being required to define their own information sources, provide and manage personal authentication to these information and data sources, and to define and manage the pre-processing of the information from these data sources to a form useful to the system. Furthermore, exported PPSs permit this information to be provided to several disconnected or intermittently connected systems that can function as providers in a distributed network of systems. In some exemplary embodiments, PPSs can be created and provided as a business service. Such services can be provided as a primary business activity, such as by consultants or as pre-packaged products, or as an incidental business activity, such as a news or other information service providing PPSs relating to the use of their news feeds.

1.2 Rule Specifications

Figure 8:
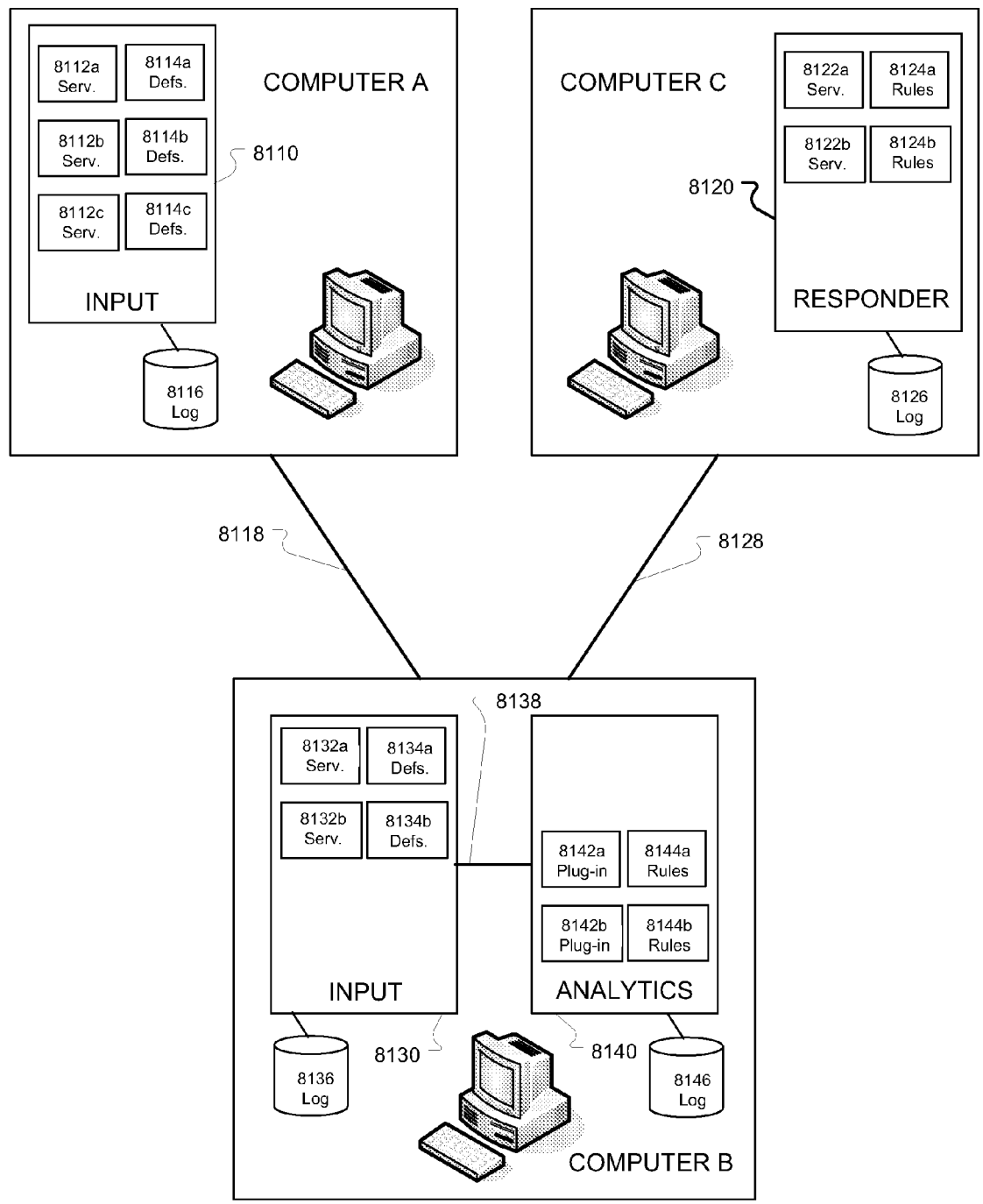
FIG. 8 shows a schematic representation of the architecture in a distributed configuration in accordance with one embodiment of the present invention.

FIG. 8 shows an exemplary Rule Specification (RS) object within the scope of the present invention. An RS is a data structure that can be provided as a data file, database entry, directory entry, or in another machine-readable format that can be used to describe a rule and associated information. RSs can be shared between users, workspaces, or systems or exported and transported between users, workspaces, systems or instances of the invention and can optionally be included in RuleBooks to simplify sharing and transporting RSs. The RS (4200) includes two or more elements, including rule description information (4210), a rule definition (4220), optional rights specifications (4230), and optional access credentials (4240). These elements can be optionally cryptographically protected (4290) for integrity (e.g. hash/digital signature) and/or privacy (e.g. encryption). An RS can be encoded using any representation-appropriate encoding scheme, such as rows in a database table, as ASCII tag-value text in a properties file, or as an XML document.

Rule description information (4210) comprises one or more information elements that describe or inform the user, or services, about the RS, including name and description, owning user, group or system, and related materials. Rule description information (4210) also can include elements that form an association between an RS and the system, including a unique identifier or other ID of the RS. The specification of the precise information elements included in this group of elements is implementation dependant.

The rule definition (4220) comprises the information describing the rule itself, as well as associated information, such as event source information (e.g. event queue names or IDs), response information and other items required for the actual evaluation of the rule and execution of any actions required by the evaluation of the rule.

Rights Specifications (4230) comprise information specifying_authorization credentials required of the rule to make use of the event queues, computing resources, etc., or other security and configuration indicia that can be used by the system to properly configure, authenticate and implement the use of the rule.

Access credentials (4240) comprise information elements that provide machine-readable information that can be used by the system to validate authentication and authorization materials, such as user ID, user name, password, digital certificate, or other indicia of authority to access, or make use of the RS. The specification of the precise information elements included in this group of elements is implementation dependant. Alternatively, rights credentials (4240) can include a rights specification, such as a rights specification defined using a rights specification language such as XrML.

One aspect of the invention is that the RSs are both transportable and sharable. Sharable RSs support the sharing of rule definitions for producer, analytics, and responders. Transportable RSs permit rule definitions to be moved between instances of the present invention.

One benefit of having sharable and transportable RSs is that they ease the burden of each individual user being required to define their own rules. Furthermore, transportable RSs permit rules to be provided to several disconnected or intermittently connected systems that can function as part of a distributed network of systems. In some exemplary embodiments, transportable RSs can be created and provided as a business service. Such services can be provided as a primary business activity, such as by consultants or as pre-packaged products, or as an incidental business activity, such as a news or other information services providing RSs relating to the use of their news feeds.

1.3 RuleBooks

One aspect of the present invention is that the various embodiments provide extensible analytics RuleBooks for user-based creation and sharing and/or transporting of event processing rules and recipes. The system supports any number of RuleBooks.

A RuleBook is a portable container object comprising zero or more rulebook items. The RuleBook is typically stored as a single object with a unique user-defined name. The benefit is that a user can share or export a set of objects as a single operation, and users of the objects can transport and import, or subscribe to, the set of objects as a set, rather than having to work with each rulebook item individually.

A RuleBook can be stored in an instance of a database, a local storage location, in a distributed directory service, such as LDAP, or by other means as determined to be useful by those having skill in the art.

RuleBooks are thus collections of objects used by the system, and are defined as portable objects comprising one or more RSs, PPSs, recipes, template specification, wizards, access control lists, watch lists, event specification, process definition, and/or other objects relevant to the processing of information and event flows. Objects contained within a RuleBook, or capable of being contained within a RuleBook, are referred to as "RuleBook items". A RuleBook can be stored as an external file that comprises at least one definition for a RuleBook item, stored in a database or directory system such as LDAP, or in any other form as determined to be effective by those having skill in the art. A Rulebook Item can be included as part of a Rulebook by direct inclusion (e.g. a copy within the Rulebook), or by reference to a known published copy. This copy can be published within a particular instance of system, can be published by another instance of the system, or can be published by an external publishing source such as enterprise wide repository, data store, or even a commercial storefront.

Individual RuleBook items (e.g. PPSs, RSs, and recipes), as well as RuleBooks, can be exported and made transportable to other workspaces, systems or instances of the invention. In some exemplary implementations, the RuleBook items, or RuleBooks, can be transported without modification from a first system to a second system. In other exemplary implementations, the RuleBook items, or RuleBooks, are converted in format by exporting, for purposes of transport from a first system, and are converted again, by importing, for use on a second system. The format of the RuleBook items, or RuleBooks, on the second system can be the same as or different from the format used on the first system. The exported format used for transport can be any format recognized and useful by the first and second systems, such as XML, name-value pairs, or other formats well known to those with skill in the art. When transported in this manner, the transported RuleBook items, or RuleBooks, become separate instances of the RuleBook items, or RuleBooks. Such transported entities have their own access restrictions, users and other aspects, limitations and controls and are not affected by changes to the original RuleBook items, or RuleBooks, they were created from, nor do changes to the transported entities result in changes to the original entities they were transported from. Transporting of such entities can be useful for creation of redundant systems, for disaster recovery purposes, for creation of variant instances of a system or part of a system, for research or testing purposes, for creation and provision of RuleBook items, or RuleBooks, as a business service, or for other purposes as will be apparent to those having skill in the art.

RuleBooks can be made available for workspaces to import or subscribe to, and can thus be shared or transported between one or more workspaces. RuleBook sharing can be accomplished using different physical copies of a RuleBook (export/import), shared from a common location (such as a common file share similar to those provided by NFS or CFIS), or by loading the components contained within a RuleBook into external storage means such as a database, and then sharing the storage means between workspaces (publish/subscribe).

RuleBooks can be made transportable between users, systems or instances of the invention. When transported in this manner, the transported RuleBooks become separate instances of the original RuleBook. Such transported RuleBooks have their own access restrictions, users and other aspects, limitations and controls and are not affected by changes to the original RuleBooks they were exported from, nor do changes to the transported RuleBooks result in changes to the original RuleBooks they were exported from. Transporting of RuleBooks can be useful for creation of redundant systems for disaster recovery purposes, for creation of variant instances of the system or part of the system for research or testing purposes, for checkpoint or backup purposes, for creation and provision of RuleBooks as a business service, or for other purposes as will be apparent to those having skill in the art.

Rulebooks can have access controls associated with them, at both the Rulebook and at the Rulebook Item level. Thus, a first user can be granted access only to a first RuleBook, a second user can be granted access to a second RuleBook, and a third user can be granted access to both the first and second RuleBooks. Similarly, a specific item within a Rulebook can be access controlled, with similar outcomes. A default RuleBook is also provided with system-provided analytics features as described below.

A workspace binds to, shares or prepares a RuleBook for transport as described above, e.g. with the import and export, or publish and subscribe capabilities. Subscribing to a RuleBook, or importing a RuleBook, makes the RuleBook itself accessible to the workspace, but other functions are used to make RuleBook contents available to the workspace, without loading the RuleBook contents into the workspace as if they had been locally defined (i.e. with full access to and control over them). These functions include "mount" and "unmount". Mounting a RuleBook makes the RuleBook contents available to a workspace to the extent permitted by relevant access controls, which can be less than full access to the RuleBook and its contents. For example, a workspace might have access to make use of RSs contained in a RuleBook, but not have sufficient access rights to change the RSs in the RuleBook, or to make use of rule wizards in the RuleBook to create new RSs. Some users of the workspace can have rights that implicitly allow them to use any mounted RuleBook. Mounting a RuleBook to a distributed workspace can cause the RuleBook to be physically distributed to all servers that support the distributed workspace. Unmount removes the availability of a RuleBook from a workspace, without removing the binding of the RuleBook to the workspace. The unmount command will not succeed if aspects of the RuleBook are referenced from components within the workspace.

The "publish" function for a RuleBook makes a specific RuleBook available to a specific workspace, user or role. In other words, it adds the RuleBook to the workspace, user or role's access list. "Unpublish" removes the availability of the RuleBook from the specified workspace, user or role. In some exemplary implementations of the present invention the ability to publish to all users or roles, or to sets of users or roles, with a single publish operation is supported.

RuleBooks provide an effective means of sharing or transporting complete and partial RSs and/or recipes between workspaces, users, roles or instances of the system. Thus, if a first user develops a particularly useful recipe for event processing, that user can create a RuleBook that comprises PPSs, event definitions, RSs, namespaces, event queue specification, and any other components required to successfully process events using the recipe. The first user can then make this RuleBook available to a second user to facilitate the second user's processing of events. The election of whether to share the processing recipe using a RuleBook, or by using a workspace that publishes an end result such as a set of event queues or response action effects, is made based upon whether the processing rules should be exposed to the second user. In the instance where the workspace publishes end results, the processing rules are not exposed to the second user. In the shared RuleBook instance, the processing rules can be exposed to the second user, depending on the access rights of the second user with respect to the RuleBook.

1.4 Namespaces

PPSs, Event objects, RSs, recipes, workspaces, and other components of the system can be named. Each of these components is specified using at least one namespace. Specification of individual components within namespaces is well understood by those skilled in the art. An example of a namespace system that is well known in the art includes that defined for XML-based systems. An XML-based schema for specifying namespaces describes namespaces and is used as follows:

```
<root
    xmlns:htext="http://domain.tld/html"
    xmlns:obj="http://anotherdomain.tld/object">
    <htext:table>
        <htext:tr>
            <htext:td>Apples</htext:td>
            <htext:td>Oranges</htext:td>
        </htext:tr>
    </htext:table>
    <obj:table>
        <obj:name>Plywood Sheet</obj:name>
        <obj:width>48</obj:width>
        <obj:length>96</obj:length>
    </obj:table>
</root>
```

In the above example, references to a "table" item would be ambiguous without the use of namespaces to permit specification of which "table" item is being referred to . . . the HTML table or the physical object plywood table. In the system of the present invention, similar ambiguities can occur with respect to PPSs, RSs, event queues, workspaces, and other aspects of the system due to factors such as publish/subscribe relationships, and importation of exported objects, such as RuleBooks. For example, if a first workspace creates an event queue for events related to news items obtained from wire services, named, "current news", then publishes it, and a second workspace creates an event queue for internal company events, also named, "current news", then publishes it, it becomes problematic for a third workspace to subscribe to only one of these two event queues unless namespaces are used to qualify the event queue names. If the event queue published by the first workspace is associated with a namespace bound to the first workspace, and the event queue published by the second workspace is associated with a namespace bound to the second workspace, the third workspace can refer to either event queue in an unambiguous fashion.

Each workspace is associated with one or more namespaces. A workspace becomes associated with each namespace as the result of binding the workspace with a RuleBook that defines one or more namespaces, by a user action that associates a namespace with the workspace, a user profile that defines one or more namespaces, or from a globally defined profile that defines one or more namespaces.

Namespaces are named using globally unique identifiers. Globally unique identifiers are well understood by those with skill in the art.

Namespaces are used by the system to unambiguously define names and references to the data and processing elements used by the system. When event queues, RuleBooks or other entities are created, they are each associated with a namespace. When these entities are bound to a workspace, such as by a publish/subscribe relationship, the namespace associated with each is retained and used to unambiguously refer to the entity or its attributes. Other entities in the workspace can have names or attributes that are the same as those of the first entity, but due to the different namespaces associated with each entity, there is no ambiguity as to which is being referenced. The system uses namespaces to specify the names and attributes of elements referenced by rules, event objects, and other components of the system.

1.5 Workspaces

One challenge in developing and deploying user-specified rules, calculations, and formulas for the processing of information events is the logical separation of sets of information and processing based upon function and usage. In some business environments, this is called the compartmentalization of information, and is known herein as "partitioning". Partitioning is supported in the present invention through mechanisms such as "workspaces" and access limitations on objects such as PPSs, RSs, event queues, and RuleBooks.

One method employed by the present invention for partitioning information is the processing of information and events within a series of "workspaces". A workspace is a sharable and portable specification for one or more PPSs, RSs, event queues, event objects, RuleBooks, templates, wizards, publish/subscribe relationships, authorization credentials, computing resources and/or associated entities used to define, implement, control and monitor event processing flows, and its subsequent implementation through provisioning of each aspect of the workspace to one or more computing resources. Each item that is part of the workspace specification is called a "workspace item". A workspace item can be included as part of a workspace by direct inclusion (e.g. a copy within the workspace), or by reference to a known published copy. This copy can be published within a particular instance of system, can be published by another instance of the system, or can be published by an external publishing source such as enterprise wide repository, data store, or even a commercial storefront.

Each workspace thus defines a specific information and event processing configuration and implementation comprising of workspace items bound to each other and to disparate computing resources. This permits a workspace to either specify specific resource requirements, or to specify types of resources and to be subsequently provisioned with available resources as necessary.

A process called "binding" establishes the association of a workspace with specific users or roles, workspace items, and computing resources. A workspace instance is said to be "bound" to one or more specific resource(s), workspace items, and/or computing resources. The binding of the workspace item with a particular resource establishes the controls between the resource and the workspace. An example of a user/action permission binding is generally described herein, however, generalized associative binding techniques are well understood by those skilled in the art. Similarly, provisioning of workspaces is performed using techniques that are well understood by those skilled in the art Each workspace participates in specific information partitions based on the access rights assigned. A workspace may be shared between one or more users or roles, and a first workspace can share RuleBooks, PPSs, event queues and other objects with one or more second workspaces. Each association is formed in conjunction with an optional control mechanism that limits the actions or capability of the associated component. For example, a user (or role shared by one or more users) may be associated with a workspace using an access control list that describes the actions the user (or role) may take (and possibly those that they may not take). Authentication and authorization can be performed at the granularity of a workspace, a specific system or server, a cluster of systems or servers, or at the enterprise level. User authentication and authorization materials, including user IDs, role assignments, and the like, may be stored in one or more database(s), registry(ies), or directory(ies), such as an LDAP, flat file(s), or other storage mechanism(s) suitable for storing user authentication and authorization materials. User preference and profile materials can be stored with user authentication or authorization materials. Alternatively, user preference and profile materials may be stored in a different one or more database(s), registry(ies), or directory(ies), such as an LDAP system, flat file(s), or other storage mechanism(s) suitable for storing user preference and profile materials.

A workspace can be associated with one or more RSs and/or recipes. In some implementations, these RSs and recipes are provided in collected sets as RuleBooks. In other implementations, they are included within the workspace as individual elements. Each association of a first workspace with a specific RuleBook makes the contents of the RuleBook available to that workspace. RSs and recipes can also be provided within a first workspace, whether created by a user of the first workspace or published by a user of a second workspace and subscribed to by a user of the first workspace. Associations can also be made to individual named components within a RuleBook or workspace.

A workspace can be associated with one or more event and information sources, as specified by one or more PPSs and acquired through use of a producer service. Optionally, direct specification of event and information sources can be used in lieu of using a PPS to specify them. These information sources can be specified within a first workspace, can be published by a second workspace and subscribed to by a first workspace, specified within one or more RuleBooks, or can be provided by a mechanism external to the system. In a distributed system, these event and information sources, as well as the producer services associated with each, can be located on a plurality of computing resources.

Similarly, one or more bindings may be established between a workspace and a computing resource that indicates the amount, or identities, of computing resources that the workspace may use. For example, a binding may be established between a workspace and a computer that limits the amount of CPU and memory provided by the computer to the workspace. A workspace can be restricted to use of particular computing resources by permitting it to bind only with those computing resources, and allowing no CPU or other resource use on systems the workspace is not permitted to bind to. Such restrictions can be for various purposes, such as information partitioning and maintenance of security, for optimizing distribution of workspace tasks over available computing resources, or for optimizing distribution of workspace tasks and information access to limit communication means bandwidth use.

Each workspace can be logically isolated from all other workspaces. In other embodiments, one or more aspects of a workspace can be shared with other workspaces. This organization provides advantages when the event and information processing within a first workspace should be hidden from a second workspace. The first workspace can make specific aspects of its processing available to other workspaces without exposing the details of the event and information processing configuration. Publishing can be used to make aspects of a first workspace available to a second workspace. "Publishing" refers to making an object available to a plurality of entities. Objects can be published within an instance of the invention, or published across a plurality of instances of the invention using mechanisms external to the invention (such as LDAP, shared file systems or database servers). Published objects can be access controlled. A workspace makes use of a published object by "subscribing" to it. Subscribing consists of making at least one aspect of a published object available to an entity other than the publishing entity. Both publish and subscribe actions are controlled actions within their respective workspaces. Users must possess special permissions in order to establish publish/subscribe relationships. Publish/subscribe relationships are especially advantageous when implementing event and information processing systems that use common information processing mechanisms or processes.

A workspace definition, including component bindings, controls such as access control lists, publish/subscribe relationships, rules, and information processing state(s) are typically defined within the components of the system. In some cases, these items are defined within a workspace. In other alternative implementations, one or more of these aspects may be defined and stored external to a workspace (e.g. globally) and be shared between one or more workspaces. A machine-readable workspace definition can be exported from a workspace into a transportable format by using the export capability associated with the workspace. Exporting comprises making at least one object ready for transportation. The complementary operation is referred to as "importing". Importing comprises making at least one transported object ready for use in at least one aspect of at least one instance of the invention. An import capability can be used to read the transportable format and create a workspace that is comprised of the component bindings, controls, publish/subscribe relationships, rules, and information processing states of the original workspace. Import and export are useful for backup and restore purposes, to create duplicate workspaces for workers performing similar duties, and to define a transportable event detection and management system arrangement.

The import and export actions are controlled actions (e.g. subject to access and configuration controls). One example transportable format is an XML representation of the workspace definition. A limited example, for illustration purposes only, of an XML workspace representation might be:

```
<WORKSPACE>
    <ID>Bob Smith's Workspace</ID>
    <PPS>
        <PPS_REF>PPS_Newsfeed</PPS_REF>
        <PPS_REF>PPS_BlogerSpot</PPS_REF>
    </PPS>
    <RULE>
        <RULE_REF>RULE_Extract_Item_By_Name</RULE_REF>
    </RULE>
    <EVENT_QUEUES>
        <QUEUE>OurCompany</QUEUE>
    </EVENT_QUEUES>
    <AUTH>Analyst_Group</AUTH>
    <OWNER>Bob Smith</OWNER>
```

-continued
```
    <ACCESS>
        <RIGHT>Analyst_Group?ADMIN</RIGHT>
        <RIGHT>All?READ</RIGHT>
    </ACCESS>
</WORKSPACE>
```

The exported workspace definition can be stored in a RuleBook, as described below.

Figure 5:
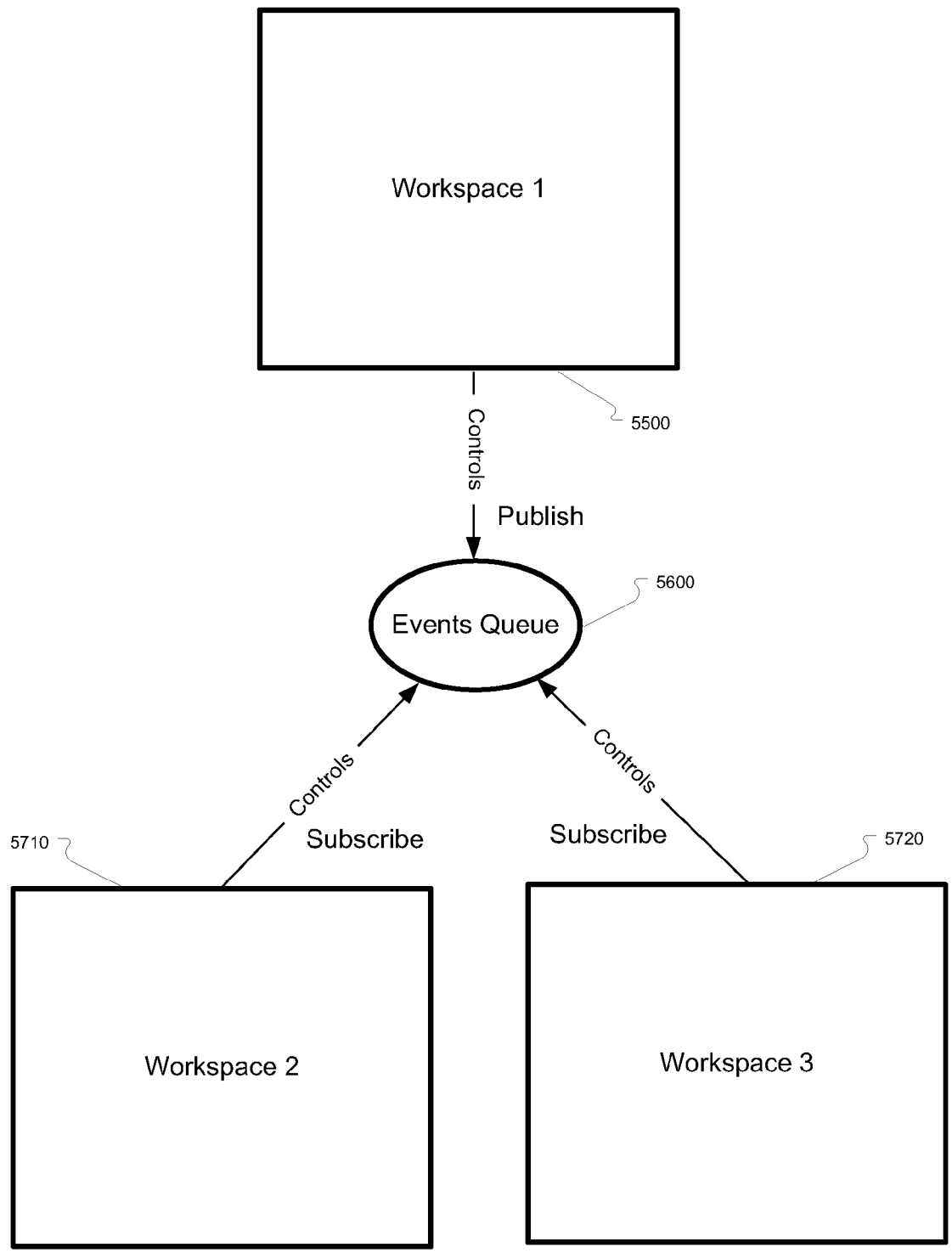
FIG. 5 illustrates a logical representation of a publish/subscribe action between workspaces.

FIG. 5 illustrates an example of a publish/subscribe model. In this model a first information processing mechanism embodied in a first workspace (5500) that provides a common pre-processing or filtering function on "raw" information. The first workspace publishes event objects to a published event queue (5600) that require additional analysis. One or more second workspaces subscribe to the said published event queue and process the said event objects according to the RSs they are bound or subscribed to. The information sources and processing techniques within the first workspace are thus hidden from subscribers to the published event queue, with only the published event queue and the event objects it contains, and their respective namespaces, being exposed to the subscribers. Two additional information processes can be implemented as a second and third workspace (5710 and 5720) respectively, each of which subscribes to the published event queue of the first workspace. The subscription to the published event queue and the controls over the subscription are shown by the subscribe arrows joining the workspaces and the event queue. Just as the second and third workspaces have no access to the information sources and processing activities of the first workspace, the first workspace has no access to the RSs and processing activities of the second and third workspaces. This is one example of how information, and processing of information, can be partitioned within the system.

1.6 Distribution of Processing

Figure 6:
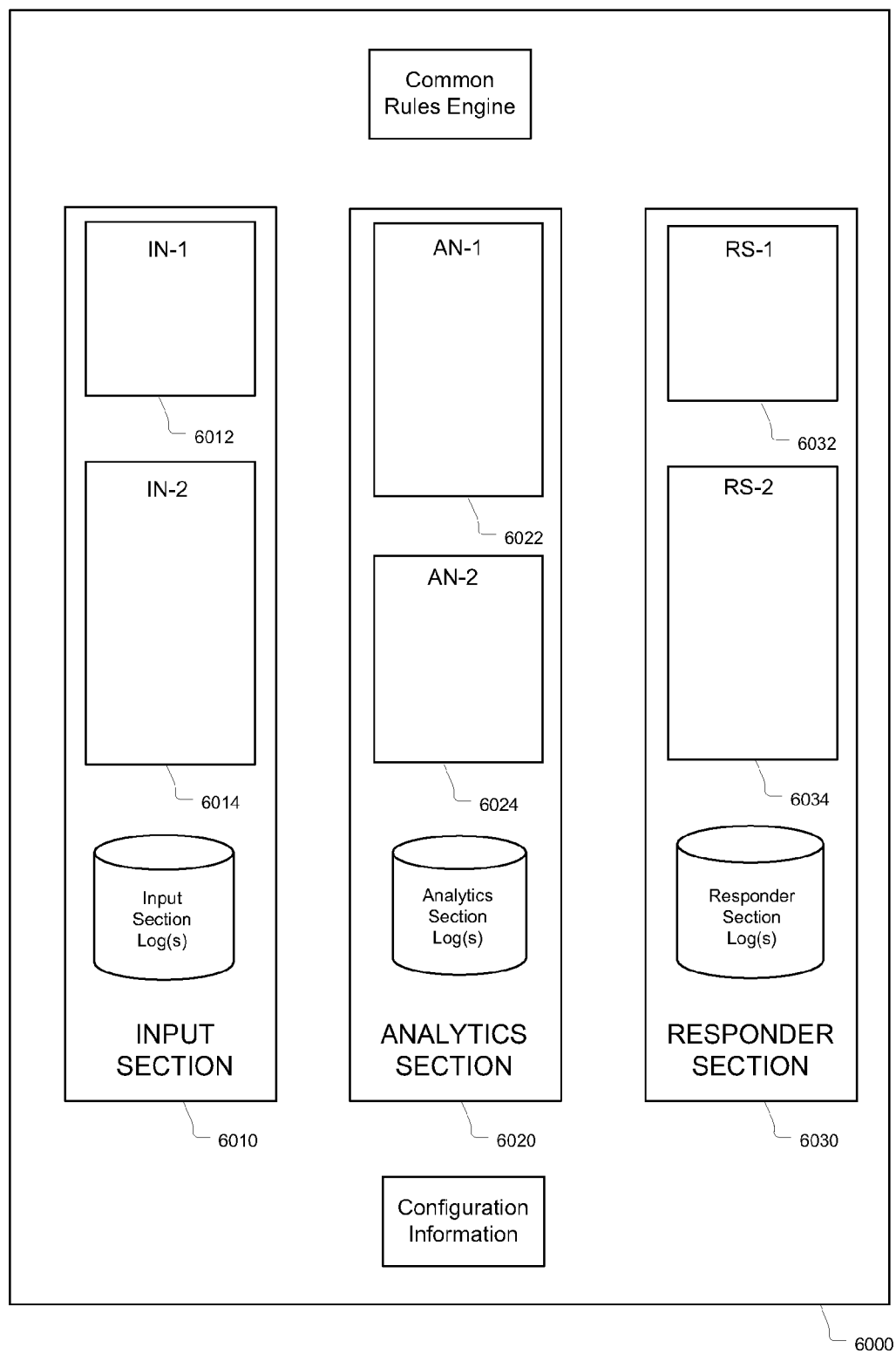
FIG. 6 shows a logical representation of the architecture in accordance with one embodiment of the present invention.

FIG. 6 shows a logical instance of an embodiment of a workspace 6000 of the present invention, which includes an input section 6010, an analytics section, 6020 and a responder section 6030. Information flows from information sources, both internal and external to the input section 6010, where it is processed, expanded and passed on to the analytics section 6020. The input section's 6010 role is to gather input from a plurality of data sources, generate additional information (e.g. the information source ID, time of collection, version of the collection software, etc.), and aggregate this information together as one or more completed event objects for further processing. Once information has been aggregated into an event object, it is passed to an analytics section 6020 for further processing by placing it into an event queue. The analytics section 6020 provides a framework in which one or more analytic rules may be applied to event objects obtained from event queues. Each event object is processed by one or more rules. The results of the rule processing can include creating additional event objects, taking specific actions, or simply saving the event for possible later use. Specific actions resulting from rules acting on event objects, including external notifications, system updates, generation of additional event objects, etc., are managed by one or more responder sections 6030. The responder section(s) 6030 provide the external interfaces and program logic required to effect each configured action.

Each of input, analytic, and responder sections may be deployed on a single computer, or may be distributed across a plurality of computers. Illustratively, each input section instance 6012, 6014, analytics section instance 6022, 6024 and responder section instance 6032, 6034 is in messaging communication with other sections. The configuration of the components within each section and the communication means used to communicate between sections are defined using configuration information for the system, each section, and each component (respectively). The distribution of particular services, workspaces, RuleBooks, event queues, and other aspects of the system can be restricted by system configuration such that specific instances of these, or those bearing particular access specifications or other characteristics, are placed only on a particular computer or computers. This partitioning of data and the processing of that data permits required levels of isolation to be maintained for security purposes, tracking purposes, or for other reasons, such as load balancing or system redundancy, while still permitting distribution of the system across a plurality of computing resources. Due in part to the implementation of the system as a set of cooperating services using shared resources to exchange information, the distribution of aspects of the system across available computing resources can change over time as computing resource availability changes so as to optimize use of available computing resources and/or maintain partitioning of data and processing.

Figure 7:
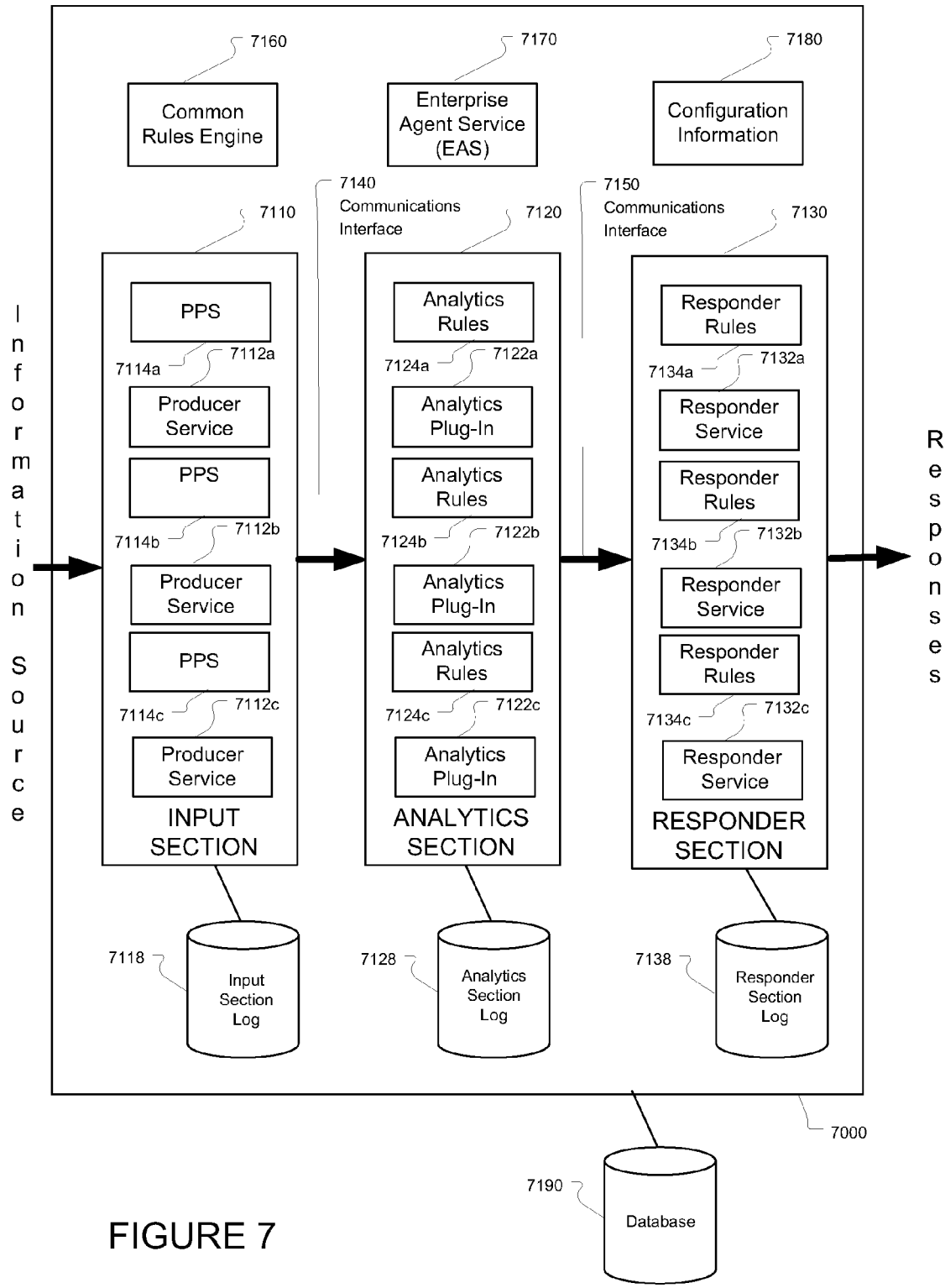
FIG. 7 shows a schematic representation of the architecture in accordance with one embodiment of the present invention.

FIG. 7 is a schematic view of a logical instance of one embodiment of the present invention, which includes an input section (7110), an analytics section (7120), and a responder section (7130) interfaced using communications means (7140; 7150). The input section (7110) further includes one or more producer services (7112a, 7112b, 7112c), which are operable to interface with at least one information source using communications means (not shown), and one or more portable producer specifications (PPSs) (7114a, 7114b, 7114c). These PPSs can be used to define the access and initial pre-processing/enrichment of one or more information sources. The input section (7110) further includes an optional input section log (7118) that records the actions of the producer services. One or more instances of input sections can be supported by various exemplary implementations of the present invention. Each input section (7110) is connected to one or more analytics sections (7120) in order to support further processing of the information.

The analytics section (7120) receives information from one or more input section instances in the form of "event objects." Thus, input and analytics sections are associated in a many-to-many relationship using one or more communications means. In some exemplary implementations the associations are made using a messaging mechanism such as a messaging technology such as MQ from IBM Corporation of Armonk, N.Y., or the Java Messaging System (JMS) from Sun Microsystems of Santa Clara, Calif. In other exemplary implementations, other technologies such as sockets, streams, and inter-process control messaging also can be used. In still other exemplary implementations, non-message-based mechanisms such as shared databases or common event queues can be used. Each analytics section (7120) further includes one or more analytics plug-ins (7122a, 7122b, 7122c) which can process event objects received from the input section over the communication means (7140), one or more analytic rule definitions (7124a, 7124b, 7124c) which are used to define the processing by an analytics plug-in, and an optional analytics section log (7128) which is used to record the actions of the analytics plug-ins. One or more instances of an analytics section can be supported by a specific exemplary implementation of the present invention. Each analytics section is logically connected to one or more responder sections using one or more instances of a communications means (7150) in order to support further processing of the information. The communications means (7140; 7150) can be similar technologies, but are not required to be identical or even compatible. Thus, each of the analytics and responder sections are also associated using a many-to-many relationship. In some embodiments (not shown), a communications means can be used to directly link input section components to responder components without the use of an analytics section.

A responder section (7130) receives notification requests (or "notifications") from an analytics section through the communications means (7150) and processes these requests. Each responder section further includes one or more responder services (7132a, 7132b, 7132c), which can convert notifications into responses for further processing, responder rules (7134a, 7134b, 7134c) that are used to configure the operation of the responder services, and an optional responder-processing log (7138), which is used to record the operation of the responder section. Analytics and responder services optionally can perform additional pre-processing/enrichment of events, and can insert events into any of the communication interfaces linking components of the system. Various embodiments of the present invention further include one or more instances of a rules engine (7160), one or more instances of an enterprise agent service (7170), and one or more instances of configuration information (7180) that defines configurations of aspects of an input section, an analytics section, a responder section, a communications means, and/or other components of the present invention. Rules engine (7160) can be provided as a common instance of a rules engine or can be distributed with instances of specific analytic and responder sections. Configuration materials (7180) can be stored as a local disk file, within a service on the local machine, in a local database (e.g. within an instance of optional database (7190)), on a shared disk, in a shared database, or within a networked service such as LDAP as dictated by implementation circumstances. In one example embodiment, the Configuration Materials (7180) describes the configuration of an input section, an analytic section, and a responder section, including the configuration of each of the services that are part of each respective section. The Configuration materials (7180) further defines the communications means used. The configuration materials (7180) define an input section, including the number and types of producer services (7112a, 7112b, 7112c)) that are started, and the computing resources that each can use. Each defined producer service is associated with at least one PPS (e.g. 7114a, 7114b, 7114c) that defines the information source and Connector/Protocol Adapters to use, the authentication credentials to use for access to the information source, any necessary pre-processing steps to perform, scripts to execute, and other information that may be required to access the information source, obtain the information and convert it into event objects as required and place the said event objects into event queues for processing by at least one analytic section. Similarly, the analytic sections configuration materials define the rules engines, RSs and RuleBooks to use in processing event objects obtained from event queues.

One feature in some embodiments of the present invention is that event queues can be published from a first workspace, which makes them available to one or more second workspaces. For example, one or more input section instances can generate event objects that are aggregated within a first event queue, the "commercial news sources" event queue. In this example, the "commercial news sources" event queue can include event objects corresponding to each article published in commercially available news sources. Producer processes of authorized users place events into the said event queue and the analytic processes of the same, or other authorized, user(s) can process the said event objects. Authorized users can create more finely grained event queues, such as an event queue for commercial news having to do with occurrences in a particular city, and appropriate producer processes can be configured to write events to these queues. In some exemplary embodiments, a responder service can generate one or more event objects and add them to specific event queues for processing. For example, an analytics section component can identify a specific news story that matches one of its rules. That rule might specify to match all news stories from the AP newswire service that have the word "NASA" in their title or text, and to create an event object related to that news item in the "NASA" event queue for all news items that match. In this example embodiment, an analytics plug-in matches keywords in the news story with the keyword "NASA," and if a match occurs, creates and sends an event object to the "NASA" event queue. The selection of response to take (e.g., create and send an event object), and where to send the resulting event object (e.g., to the event queue) are specified as part of one or more rules.

A system in accordance with an embodiment of the present invention can be developed using any of the technologies known to those skilled in the art of developing complex software systems. In an example embodiment, the software components can be developed in Java using a service-based framework such as the Spring Framework. Rules engines and related components can be provided using java-compatible technologies such as the Drools Rules Engine and the Antlr Parser tools. Other technologies, such as C# or C++ can also be used. The database (7190) can be any available database, such as Oracle, MySQL, Informix, DB2, HSQLDB, Cloudscape/Derby, or another database product. The database can be stored solely within a computer memory (e.g., RAM), within memory and on a persistent memory such as disk, or solely in a persistent memory. Similarly, a networked service can be any available networked service, for example, an LDAP accessible directory service, such as the Active Directory product provided by Microsoft Corporation of Redmond Wash. Other types of network services are described at various points herein. Each of these services can be implemented by those skilled in the art.

2 Example Use

An example system in accordance with one embodiment of the present invention is an enterprise-class system, meaning the system needs to support many different deployment configurations. Distribution of services, portable producer specifications, rule specifications, and event descriptions and objects allows embodiments of the system of the present invention to be deployed across a distributed network of computer systems. One exemplary deployment is shown in FIG. 8, which shows a sample distribution, in which a first computer system (A) includes the input processing section (8110), including source services (8112*a-c*), source definitions (8114*a-c*), optional log (8116), and a communications means (8118). The communications means operably connects the first computer system to a second computer system (B) using networking techniques well known to those skilled in the art. One such well-known technique is TCP/IP networking. In some embodiments, the networking techniques used may not require a reliable network layer upon which to function, and can provide message store-and-forward and queuing capabilities. These capabilities provide for a distributed, intermittently connected system that is effective to receive and process data, and then provide events of relevant information to other systems for further processing. The second computer system (B) includes an input section (8130) and an analytics section (8140), including components as described above for FIG. 7. The input and analytics sections are joined using a communications means (8138), such as TCP/IP, messaging queues, or other inter-process communication system, such as shared memory, in order to pass information between the input processing section of the second computer system (B) and at least one analytics section. The analytics section of the second computer system (B) is also connected with the input processing section of the first computer system (A) (8110) using the communication means (8118). The second computer system (B) is also connected to a third computer system (C) using communications means 8128, which can be any of the communications means herein described. The third computer system (C) includes a responder section (8120) and is connected to the second computer system (B) through the communications means (8128), and further includes responder services (8122*a*, 8122*b*), responder rules (8124*a*, 8124*b*), and optional log (8126). Present in this configuration, but omitted from the drawings for clarity, is configuration materials that describe the configuration of each of the sections.

Also present in the system, but omitted for clarity, are web servers and web services that provide a user interface. These components can be present on any computer system that hosts aspects of the described invention. Alternatively, a user interface can be constructed using other technologies, such as hard-coded C/C++ or Java applications. The determination of user interface specifics is implementation dependent and can be implemented by anyone skilled in the art. Web-based examples of user interfaces presented herein are exemplary in nature and are not intended to limit the implementation to a web-based interface.

Figure 9:
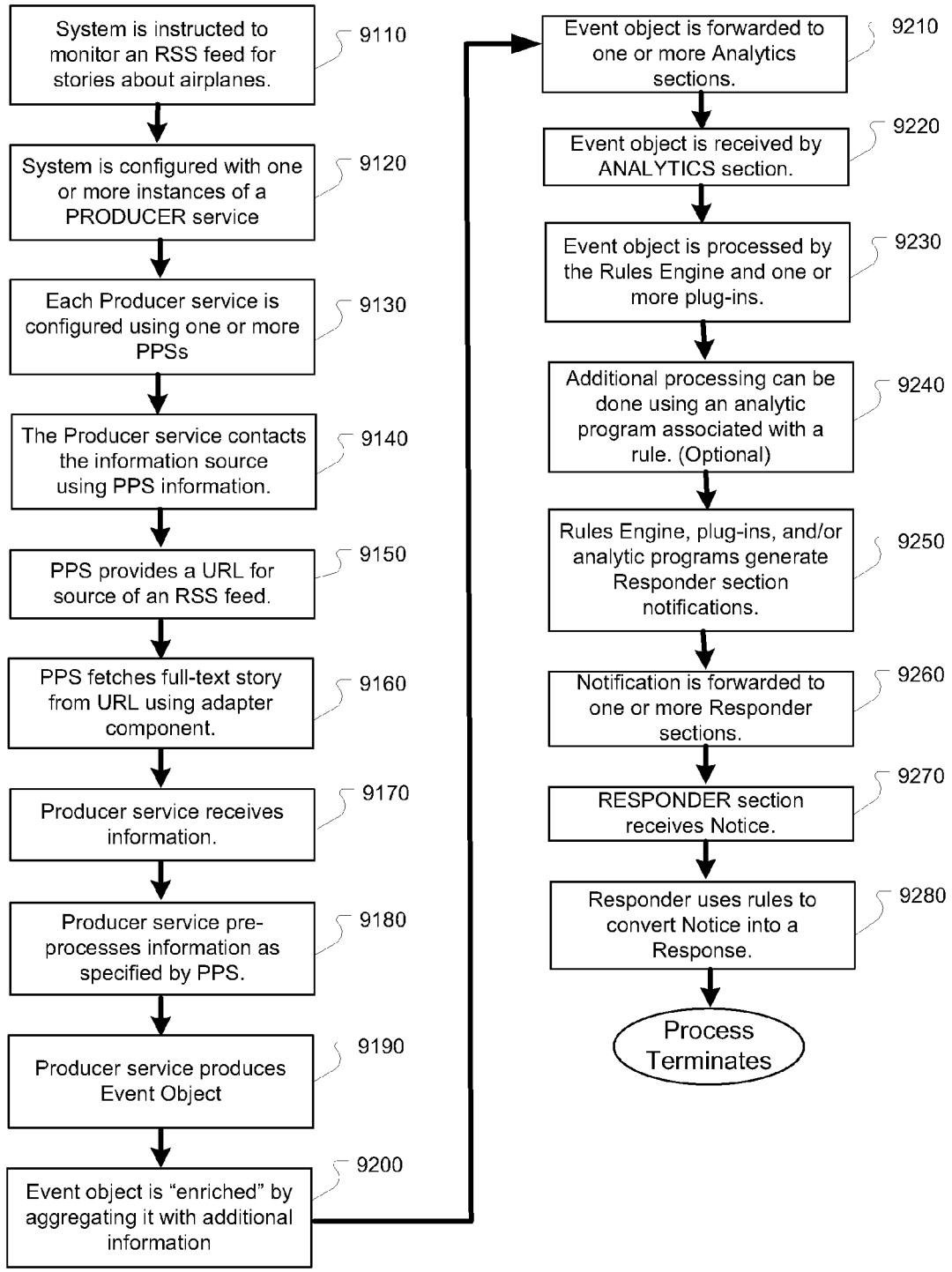
FIG. 9 is a process flowchart depicting a first exemplary use of an enterprise-wide event management system.

FIG. 9 depicts a first exemplary use of an enterprise-wide event management system. The system is configured to monitor an RSS news feed for stories about airplanes (9110). The system is configured with several instances of an RSS producer service (9120); each instance of the service is configured using one or more PPSs that describe the RSS interfaces to external information source(s) (9130). The producer service contacts the information source using the PPS information and access credentials provided in the source definition (9140). In this example, the information source is an RSS feed. The PPS provides a URL for source of the RSS feed (9150), and the pre-processing step of fetching the full text story using the URL embedded in the RSS feed using a specified RSS connector/protocol adapter component (9160). This configuration establishes the information flow from the information source to the producer service. The producer service receives the information provided (9170), performs the specified pre-processing as specified by the PPS (9180), and produces an event object based upon the information provided (9190). In some cases, the event object contains some or all of the specific information provided to the producer service; in other cases, the event contains meta-information relevant to the event, such as the time at which the information was obtained, the version of the software used to obtain the information, or other information about the source information or how it was obtained, instead of, or in addition to source information provided to the producer service. In yet other cases, the event includes a reference to the source information rather than the information itself, and optionally including meta-information about the source information or a reference to such meta-information. In some cases, additional event objects can be created and placed in event queues so as to cause responses that collect additional information from the same or different information sources and aggregate said additional information with the original event object or its content in a new event object (9200). This, and similar, processes of refining "raw" information by obtaining additional information and aggregating the additional information with the first information is called event enrichment. The enriched event is forwarded to one or more analytics section(s) (9210) based upon the specified processing of the relevant rule specifications.

Continuing with the exemplary use, an event representing a newly received story is received by the defined analytics section (9220) where the event is processed by a rules engine and one or more analytics plug-ins (9230). The rules engine processes the event in response to one or more rules defined for use by the analytics section. These rules can be taken from a database, a directory, shared files, or other storage means known to those skilled in the art. In some embodiments, groups of rules can be used together. These rules also can be from collections of sharable and portable RSs and recipes, called "RuleBooks", can be associated as part of a larger rule, or can be individually provided. In addition, further analysis of events can be provided using plug-in analytic programs associated with at least one rule (9240). The rules engine and/or analytic programs can generate additional responder section notifications on the basis of the rules processing, or upon the basis of processing by an analytics plug-in program (9250). The responder section notifications are forwarded to one or more responder section(s) based upon the specifications of the relevant RSs (9260).

The responder section operates one or more responder services, which convert responder notifications received within the system (9270) into responses (e.g., external notifications, messaging, or other actions) (9280). For example, a responder service can convert responder notifications resulting from the processing of an event object (such as the one above representing a news story that passed the pattern matching for "airplane") into an e-mail message, using information contained within the event object to fill in one or more aspects of the email message, such as a "To:" address or "Subject:". Each responder service has one or more configuration components in the form of responder rules. These rules can be taken from a database, a directory, shared files, RuleBooks, or other storage means known to those skilled in the art.

The resulting response (e.g., external communication or other action) (9280) completes the exemplary processing of a responder notification by the system of the present invention.

2.1 Distributed Architecture

The architecture of the event management system is inherently distributed. Distribution of the system provides scalability, redundant processing, and other benefits. The distributed architecture is enabled by the communication interfaces and modular component design described above. There are two primary distribution strategies: the distribution of services and rules management and the distribution of event processing and load-balancing. The distribution of services and rules management permits the system to operate with a minimum of centralized IT support, and leverages the capability of the system to collect and share rules and information processing techniques between users and their workspaces. Distribution of event processing permits the construction of scalable, highly redundant systems that are resistant to single point failure and that can be quickly scaled in response to changes in data volumes, information workflow, and user communities. Different information management and distribution strategies can be employed to implement these features—the choice of specific information management mechanisms utilized is implementation dependant. It is advantageous for distributed instances of an enterprise-wide event management system to use a common time source, so event and analytic timing is consistent. The use of common distributed time sources is well understood in the art.

One approach to distributing an enterprise-wide event management system is to distribute PPSs, services, RSs, recipes, RuleBooks, and configuration information between one or more computer system instances and link these instances using one or more communication means. In a first embodiment, each instance of the system of the present invention runs a web interface and connects to the same back-end data storage service or database, but each server instance negotiates for and actively loads only a subset of the services and rules stored in the data storage service or database. A back-end database system or storage server is preferably highly available. In an alternative embodiment, the backend database is not used. Rather, the configuration materials, PPSs, RSs, services, and other aspects of the system are propagated to each system that requires them. The propagation can be performed manually, using automated tools, or using shared disks or services such as a mounted disk or by integrating the materials as part of a shared directory service. Other mechanisms for sharing information between system instances also can be used and are well understood by those with skill in the art.

2.1.1 Redundancy and Fault-Tolerance

An enterprise-wide event management system of the present invention provides for an implementation-dependant degree of redundancy and reliability. Distribution of services as described above provides redundancy and fault tolerance by distributing service instances across several computer systems. The distributed computing systems can be configured using one or more communications means in order to effect distribution and redundancy.

When a rules engine (within the analytics section) or producer service is configured to use instances of RSs stored within a shared storage system, service, or database, the rules engine enables a new style of distribution: event processing flow then can be load-balanced across multiple computer systems while sharing a common configuration and rules set. Each system instance connects to the same storage system, service, or database. Each service instance is able to evaluate and update any rule in the system, consistent with access controls, because the state of the rule network is entirely persistent within the database. However, each service instance only processes a fraction of the incoming event flow. This approach helps to eliminate the I/O bottlenecks that occur in systems that process large volumes of data, and provides redundancy and fault-tolerance to the architecture. Event queues and service in-core lists can be persisted to disk, storage service, or database in order to permit fault tolerant restarts without loss of information.

2.2 Controls on Use

An enterprise-wide event management system in accordance with various embodiments of the present invention provides for controls on the use and flow of information using access control lists on each security enabled system object and service. These access control lists are used to grant access rights to the object or service. Access controls can be used to restrict creation, storage, viewing, modification, use, export/import, publishing/sharing or deletion of PPSs, RSs and recipes, RuleBooks, event objects, event queues, workspaces, or other aspects of the system.

Each security-enabled system object and service contains a set of access control list entries. Each entry specifies:
principal (string)—a user name or, if prefixed by "ROLE_", a role name
permission (string)—READ, WRITE, or ADMIN
granted (Boolean)—either true or false The permission field is completely flexible. Any text can be entered as a permission, so the list of available permissions can grow as needed. When a new database retrieval or update operation is written, the operation specifies which permissions are acceptable to complete the operation.

2.2.1 Example Access Control List

Suppose there exists a rule "Correlate market activity" that is managed by John Smith (jsmith), edited by Mark Hancock (mhancock), and readable by any user (ROLE_USER). However, Mike Jones (mjones) should not be able to see it at all. An exemplary access control list would look like this:

| Principal | Permission | Granted |
|---|---|---|
| jsmith | ADMIN | true |
| mhancock | WRITE | true |
| mjones | READ | false |
| ROLE_USER | READ | true |

In this example, ADMIN permission implies READ and WRITE permission, and WRITE permission implies READ permission.

In the examples given later in this document, it is assumed that the user has the proper permissions (READ, WRITE, or ADMIN) to successfully perform the described action(s).

2.2.2 Security in the User Interface

Users see only the objects they have permission to see. User interfaces inform the user of their access rights by displaying or hiding links, form buttons, and other controls as appropriate. (For example, if a user has read access but not write access, they can view an object's detail page but the link to the Edit feature will be hidden.)

If a user attempts to access a restricted resource or method directly from the web service interface, they will receive an appropriate HTTP error (e.g., 403 Not Authorized or 404 Not Found).

2.3 Logging and Auditing

The system in accordance with various embodiments of the present invention provides for auditing and logging of configuration and configuration changes, event object generation, event queues, service operations, and rule evaluations. The system also provides for object access, export/import, and publish/subscribe logging.

2.4 Working with RuleBooks

Exemplary implementations of the present invention provide means to create new RuleBooks, edit existing RuleBooks, publish and un-publish RuleBooks, subscribe to published RuleBooks, export and import RuleBooks and destroy (delete) RuleBooks. These functions can be restricted or prohibited based on the access rights of the user or role attempting them.

For example, if a user wants to publish several rules used by their stock-watching event processing flow, so that other users can implement their own stock-watching event processing flows, the user can create a RuleBook containing their stock watching rules, and the PPSs used to collect the information to feed through the rules. Other users can subscribe to the RuleBook, subject to access controls, and use the rules to establish their own stock-watching event processing flows.

2.4.1 Creating a New Rulebook

In an illustrative embodiment, the following steps may be carried out to create a new RuleBook:

Step 1. Select "New>RuleBook" in the navigation menu. The New RuleBook screen appears and prompts the user to enter information for the new RuleBook.

Step 2. Enter a name and description for the new RuleBook, and also select one or more RuleBook items from the displayed list for inclusion in the new RuleBook.

Step 3. The system calculates minimum access rights for the new RuleBook based on the access rights of the RuleBook items selected for incorporation into the new RuleBook and displays this information. The calculated access rights will be equal to the most restrictive access rights of any RuleBook item selected for inclusion into the new RuleBook. The access rights can be adjusted so as to make the access rights more restrictive if desired. Selecting less restrictive access rights requires specific rights.

Step 4. Set the encrypt/no-encrypt checkbox appropriately.

Step 5. Optionally select a key to use to digitally sign the RuleBook.

Step 6. Select "Save". The new RuleBook is created and saved to the current Workspace. If "Cancel" is selected, rather than "Save", the operation is aborted and a new RuleBook is not created.

2.4.2 Editing a RuleBook

In an illustrative embodiment, the following steps may be carried out to edit an existing RuleBook so as to add or remove RuleBook items currently incorporated into the said RuleBook:

Step 1. Select "Edit>RuleBook" in the navigation menu. The system responds by displaying a list of existing RuleBooks in the current workspace. This list includes both private RuleBooks and those that are subscribed to and bound to the workspace.

Step 2. Select the RuleBook to edit. The system then displays a list of the RuleBook items currently included in the selected RuleBook.

Step 3. To delete RuleBook items from the RuleBook, select one or more RuleBook items from the displayed list of currently included RuleBook items, and select "Delete" to mark the selected RuleBook items for deletion. The system indicates the pending delete status for these items by altering their appearance, such as by lowering contrast, changing color, or by other means as are well understood by those having skill in the art.

Step 4. To add additional RuleBook items to the RuleBook, select "Add". A list of available RuleBook items from the user's workspace, both local and subscribed and bound items, that are not already incorporated into the RuleBook, is displayed. Select the RuleBook items to add from the displayed list, using means well understood by those with skill in the art, such as clicking, double-clicking, dragging, etc., and these are added to the list of RuleBook items in the RuleBook, but marked so as to indicate their pending status, such as by altering their appearance by using a different color, contrast, or other means as is well understood by those having skill in the art.

Step 5. As RuleBook items are deleted from, or added to, the RuleBook, the system calculates minimum access rights for the RuleBook based on items currently in, or pending inclusion in, the RuleBook and displays this information. The access rights can be adjusted to be more restrictive if desired. Making the access rights less restrictive can require specific authorization credentials.

Step 6. Set the encrypt/no-encrypt checkbox as desired.

Step 7. Optionally select a key to use to digitally sign the RuleBook.

Step 8. Select "Update" and the RuleBook changes, whether deletions, additions, changes to access rights, encryption state or digital signing, are made and the updated RuleBook is saved to the current Workspace, replacing the original RuleBook. In some exemplary implementations, the original RuleBook can be preserved as a backup or prior-version copy. If "Cancel" is selected, rather than "Update", the operation is aborted, any changes made are ignored, and the original RuleBook is not altered or replaced.

2.4.3 Publishing a RuleBook

In an illustrative embodiment, the following steps may be carried out to publish a RuleBook so as to make the said RuleBook available to other users, roles or workspaces:

Step 1. Select "Publish>RuleBook>New" in the navigation menu.

Step 2. Select the RuleBook to publish from the displayed list.

Step 3. Enter or select the user, role, or wildcard specification to publish the RuleBook to.

Step 4. Select "Publish", and the RuleBook is published to the specified user(s) and/or role(s) and/or workspace(s). Select "Cancel" to abort the operation without publishing the RuleBook.

2.4.4 UnPublishing a RuleBook

In an illustrative embodiment, the following steps may be carried out to unpublish a RuleBook, so as to remove it from availability for subscription by one or more other users, roles, or workspaces:

Step 1. Select "Publish>RuleBook" in the navigation menu.

Step 2. Select the RuleBook to unpublish from the displayed list of previously published RuleBooks.

Step 3. In the displayed information for the selected RuleBook, select the users, roles, workspaces or wildcard specifications to remove from publication of the RuleBook or select "Clear All" to remove all users, roles, workspaces and wildcard specifications (this makes the RuleBook private).

Step 4. Select "Publish" to commit the changes and the RuleBook is unpublished and removed from availability for the specified user(s) and/or role(s) and/or workspaces, or, if "Clear All" was selected, the RuleBook is made private and is no longer published. If "Cancel" is selected, the operation is aborted, and the publication status of the RuleBook is not altered.

Step 5. Note that unpublishing a RuleBook does not alter current subscriptions and bindings for the RuleBook. Those users, roles or workspaces that are currently subscribed to the RuleBook will retain access to the RuleBook, even after the RuleBook is unpublished for them, until such time as they unsubscribe from the said RuleBook. This avoids disruption of event processing flows for a first user, who is subscribed to a published RuleBook and making use of the RuleBook items incorporated into the RuleBook, when a second user, who has published the RuleBook, accidentally or intentionally unpublishes said RuleBook.

2.4.5 Subscribing to a RuleBook

In an illustrative embodiment, the following steps may be carried out to subscribe to a published RuleBook, so as to permit binding it to a workspace for use:

Step 1. Select "Subscribe>RuleBook" in the navigation menu.

Step 2. Select the RuleBook to subscribe to from the displayed list of available published RuleBooks.

Step 3. Select "Subscribe" and the RuleBook is added to the user, role, or workspace as a current subscription.

2.4.6 Exporting a RuleBook

In an illustrative embodiment, the following steps may be carried out to export a RuleBook from the current workspace, so that it can be imported into another workspace, or transported to another instance of the system:

Step 1. Select "Export>RuleBook>from the navigation menu.

Step 2. Select the RuleBook to export from the displayed list of RuleBooks in the current workspace. These can be private RuleBooks or RuleBooks that are subscribed to, providing that access rights are sufficient for export.

Step 3. Select the transport format from the list of available transport formats. The format chosen should be compatible with the import capabilities of the intended destination.

Step 4. Select "Export", and a copy of the selected RuleBook is converted to the transport format and saved in the user's Workspace. The saved transportable RuleBook can then transported to the destination. If "Cancel" is selected, the operation is aborted and the RuleBook is not exported.

2.4.7 Importing a RuleBook

In an illustrative embodiment, the following steps may be carried out to import a RuleBook into the current workspace, so that it can be used:

Step 1. Acquire a transportable format RuleBook by means well known to those having skill in the art, such as copying a file within a file system, receiving a file as an e-mail attachment, or copying from a portable storage medium, such as a CD-ROM, USB "thumbdrive", or other similar means.

Step 2. Incorporate the transportable format RuleBook into the current Workspace.

Step 3. Select "Import>RuleBook" in the navigation menu.

Step 4. Select the transportable format RuleBook to import from the displayed list.

Step 5. Select "Import", and the RuleBook is converted from the transportable format into the internal format used for RuleBooks by the system, and saved in the current Workspace as a private RuleBook. If "Cancel" is selected, the operation is aborted and the RuleBook is not imported. The transportable format RuleBook is not altered, and remains in the current Workspace in transportable format.

2.4.8 Destroying a RuleBook

In an illustrative embodiment, the following steps may be carried out to destroy (delete) a RuleBook:

Step 1. Select "Destroy>RuleBook" in the navigation menu.

Step 2. Select the RuleBook to destroy from the displayed list of available RuleBooks in the workspace.

Step 3. Select "Delete". The system requests confirmation of the deletion, and provides a "Yes" option to confirm deletion, and a "No" option to deny confirmation. If the deletion is not confirmed (i.e. "No" is selected), the procedure is aborted and the RuleBook is not destroyed. If the deletion is confirmed (i.e. "Yes" is selected), the system has three possible actions that will be taken. The selection of an action is based on the state of the RuleBook.

1) If the RuleBook is private, and has no subscriptions, the RuleBook is deleted.

2) If the RuleBook is private, and has subscriptions (i.e. the RuleBook was published in the past, and has been subscribed to at that time), the RuleBook is removed from the current workspace and marked "pending delete" by the system, but the RuleBook is not deleted immediately.

3) If the RuleBook is published by another user, role or workspace, and has been subscribed to for the current workspace, the subscription is cancelled. If the RuleBook is marked "pending delete" and this was the last subscription to the said RuleBook, the RuleBook is deleted.

2.5 Events

Events are related to real-life occurrences pulled in from the outside world by producer services. Events can be anything that a user has deemed of interest, such as 911 dispatches, breaking news headlines, network outages, and the like. Some other examples of events include:

Stock prices
Credit card transactions
Company public announcements
Wire transfers to bank accounts
IP address detections
Call center activities
Network conditions
Community crimes
Radar detections
Weather events
Building control system reports
E-mail reception Producer processes automatically generate event objects as they gather and pre-process inputs from information source, such as web pages, RSS feeds, sensors, databases and others. Millions of event objects can be passed through the system every day. When an event object is generated, its parameters are identified and used to assign the event object to a specific event queue. As described above, producer services manufacture event objects based upon the data they extract from underlying systems and information feeds. A single real-world event, such as a stock price change, news article, or credit card transaction, can result in a plurality of event objects being generated within the system. These event objects can be placed in a plurality of event queues for processing by one or more analytic sections. Rules as applied to event objects can produce additional event objects and trigger responder services to take action as a result of events. Therefore, event objects are central to event processing flows and resulting actions by the system.

An event object has one or more properties associated with it. Each event object can include properties common to all event objects, some properties common to one or more groups of event objects, and some properties that are specific to a particular event object type. The properties associated with each type of event object are defined at the time the event object type is defined. Some common properties associated with event objects include:

a timestamp property. The timestamp property is set to the current time when the event object is added to an event queue. Alternatively, a producer service can set the timestamp to the time the event object is created, or to the time at which the source information that triggered the creation of the event object was acquired.

an optional topic property. The topic property is set by the pre-processing rules or scripts specified in the PPS that configures the operation of the producer service that creates the event object. In some exemplary implementations, the event topic property is set to the name of the event queue into which the event is first inserted. In other exemplary implementations, the event topic property is set to the name of the event queue the event object is currently associated with. In still other exemplary implementations the event topic property is set to one or more tags that describe the general nature of the information that triggered the creation of the event object, such as "news", "blog post", "aerospace", "medical techniques", or "stock price change".

an optional source property. The source property identifies the source of the event object, e.g. the ID of the producer service that created the event, the PPS that controlled the producer service, or a descriptive name for the original source of the information collected by the producer service.

An event type property. The event type uniquely identifies the type of event object. The type of the event object determines the structure of the event object, and defines the properties the event object can include.

Each event type, class, and property is named within one or more namespaces, making them usable within one or more rules or workspaces. Namespaces are described in more detail above and below.

In some implementations of the present invention, an event object encapsulates a Java object of any type. The properties of the event object are the properties of the enclosed Java object. Event objects are typically read-only once they are created. For read only event objects, modifications to event objects are not allowed, although an event object can be copied and the copy modified.

2.5.1 Transportable Event Definitions

Event definitions, including the specification of event type and event properties, can be exported in a sharable or transportable form. Sharable and transportable event definitions facilitate the use of sharable and transportable services, PPSs, RSs, and related entities to facilitate distributed processing and creation of additional instances of the system, such as for disaster recovery, research or testing purposes. They can also be used to enable sharing and porting of services, PPSs. RSs, RuleBooks and workspaces between users, roles and workspaces or between instances of the system for other purposes, such as provision of such entities as a business service.

2.5.2 Event Persistence

In normal use, an event object is "used up" (consumed) when the event object is processed by a rule or rule set, however, it is sometimes desirable to make event objects available beyond their initial processing. This is advantageous when more than one event object is required to identify a pattern of events, such as a particular sequence of events, a particular frequency of events, a triggering event count, or a particular set of events all occurring within a given period of time. This process of retaining event objects and making them available for further processing is called "persisting" an event object. An event object that has been persisted is said to be "persistent".

In some exemplary embodiments, an event object can be made persistent by adding the event object to a persistent event queue. The persistent event queue can be made persistent by safe-storing it to a non-volatile storage device (e.g. a hard disk, flash memory, or magnetic tape) or a database, and by the system not removing event objects from persistent event queues when they are processed. Event objects will remain in this event queue until they are explicitly removed, and can be processed a plurality of times while they remain in the persistent event queue. This type of event persistence is useful when a manual interaction is desired to acknowledge a particular event.

In other exemplary embodiments, persistent event objects can be stored in a memory list by one or more services in order to make the event persistent. This type of event persistence can be made to survive process crashes and shutdowns by safe-storing the events stored in memory to a non-volatile storage device (e.g. a hard disk, flash memory, or magnetic tape) or a database.

In still other exemplary embodiments, persistent event objects can possess an expiration parameter that specifies a time at which the event object should be destroyed, the number of times that an event object can be processed before it is automatically destroyed, or another rule that specifies the conditions under which the event object should cease to be persistent and should be destroyed. This capability is useful for implementing time-limited or other semi-persistent event processing. Such capabilities can be useful, for instance, when an event object has persistent utility, but only for a limited time span, such as a current building temperature reading in a building control system that acquires and broadcasts a new temperature reading every 15 minutes, or a system that calculates a moving average for closing stock prices over the prior 30 days.

In yet other exemplary embodiments, the system can automatically persist all event objects until they are manually deleted, or automatically deleted under control of one or more rules.

2.5.3 Event Enrichment

Events can be "enriched" during processing by the system. Enrichment is a process by which additional properties and/or data are associated with an event object as the event object is processed by the system. Enrichment of event objects is a rule-based process, in which event objects are first identified by one or more rules, the responses of which are specified to either make changes in the event object's structure (e.g. add/remove/change properties), or to collect additional information and add that additional information to the event object.

In a first exemplary embodiment, adding, removing, or changing a property of the event object can enrich an event. For example, a rule can identify an event object of a first type, and for all event objects of this type that it identifies, add a property to the event object that indicates that the event object was processed by a specific instance of a service or a rules engine, or at a particular time. This type of event enrichment is useful for marking event objects as processed (which is particularly useful for persistent event objects), for adding other relatively static properties that indicate an aspect of the event or event object, and the like.

In a second exemplary embodiment, an event can be enriched by employing a rule that specifies a response that collects additional information and adds it to the event. For example, an event object can correlate to a stock symbol and price, and the response might be to use an SQL statement parameterized by an event object's properties to look up the stock ticker symbol in a database and obtain additional information about the stock issue from the database, such as name or price/earning ratio. This event enrichment procedure can be repeated a plurality of times for any given event. For example, once the original event object containing a stock symbol and price has been enriched by the SQL database query with the company name and P/E ratio, another rule can result in a response that triggers the activation of a producer service that uses a PPS specifying collection of information about the company that issued the stock, and the activation of rules that send any information discovered to a stock analyst's e-mail address. In this manner a stock reaching a given price point, for instance, can automatically result in gathering information about the company and delivery of this information to an analyst for determination of whether the stock price is justified or not. Event enrichment information can be added to the original event as new or changed properties and values, or can be implemented by creation of a new event object that contains both the original event's information and parameters as well as the new information and parameters resulting from enrichment actions.

In a third example embodiment, an event object can be enriched by combining information from two or more event objects. For example, a first event object is generated for a news story that matches a keyword rule that results in it being put in the "NASA" event queue, and a second event object is generated for the same news story that matches a keyword rule for "airplane". The two event objects can be combined to produce an enriched event object that has properties that indicate that the news story matches the "airplane" keyword and is (or was) in the "NASA" event queue.

The event enrichment process can be repeated without limit, enabling the provisioning of research/information enrichment steps using rules and RuleBooks, resulting in the fully automated production of packages of enhanced information from a variety of information sources that are provided to or by end-users.

2.5.4 Event Bus and Event Queues

The system supports several technical communications means for communicating between and within system instances and services. Each of these technical communication means provides an interface abstracted as one or more sharable lists of events, individually called an "event queue". Event queues also can be implemented using techniques other than communications techniques described above, for example, using a table in a shared database, an in-memory list, or a shared messaging bus. Collectively, the operating set of communication mechanisms implemented for an implementation of an enterprise-wide event management system is called the "event bus."

Event queues can be published and shared within the system, or they can be left private and visible only within a single workspace. Private event queues are used internally to event processing flows, or are made available to specific services, users, roles or workspaces on the basis of specific access controls. The visibility of event queues, either private or published, can be controlled using one or more access controls, as described herein. Each event queue can be ordered as a queue (first in, first out), or can be priority ordered based upon one or more event object properties.

Each event queue can have zero or more associated event sources, such as producer services or response section services that generate event objects in response to processing of other event objects according to rules. Each event queue also can have zero or more associated event object consumers, such as analytic section services. These event object consumers obtain event objects from an event queue and process them. Obtaining an event object from an event queue deletes the event from the queue, unless the event queue is a persistent event queue, or the event object has a parameter specifying that it is persistent. The association of an event source and the right to place an event object into an event queue is controlled by one or more access control mechanisms, as described herein. In some exemplary implementations the access rights of an event source can be specified in a PPS. Similarly, the association of an event consumer, and the right to retrieve an event from an event queue, is controlled by one or more access control mechanisms. In some exemplary implementations the access rights of an event consumer can be specified in an RS.

Using any of these techniques, event objects can be propagated to one or more components of the system. Distribution of event objects can occur either by sharing event queues between distributed aspects of the system or by replication of event objects to distributed aspects of the system. Some or all of the event objects in the event queue can be propagated in this manner.

Event queues also provide for the configurable safe storing of event objects added to each event queue. The safe storing of event objects in event queues is a configuration option that can be turned on or off and is used to determine when to save event objects. By default, all event objects are saved to a database, or other non-volatile storage, immediately upon receipt (i.e. at the time they are removed from an event queue). Optionally, event objects can be processed first and only then saved if they are found to participate in a partial match with one or more rule(s).

If one or more systems or services shut down, lose power, crash, and so on, then upon restarting the one or more systems and services the working memory can be rebuilt by rereading all the safe-stored event objects into working memory. (No responses are executed at that time, since it is assumed that they would have already been executed previously; the operation simply returns the working memory to the state it was in previously.) This option is also configurable; if turned off, no attempt to reload events from the safe-store is made upon startup.

Event queues can have properties associated with them. These properties can be used to define mandatory and optional aspects of event objects associated with each event queue, to optionally define default values for these properties if alternative values are not assigned, or to define aspects of the event queue itself, such as a name or ID, access rights required to place event objects into the queue, or to remove event objects from the queue, or by producer services to determine appropriate event queues to place generated event objects into. Event queue properties are used in a variety of ways as described herein.

Event queues can be used to categorize event objects and their properties. When an event object is created, the event object's properties and values are identified and categorized using one more rules and/or event queue definitions. The event object is then added to each appropriate event queue. If there is more than one event queue that is appropriate for a given event object, the event object is duplicated and one copy placed into each appropriate event queue. Event objects in a published event queue are made available to any subscriber to the said published event queue. For example, if a news-related event object is added to the "World News" published event queue, any subscriber of the "World News" published event queue can process the said event object. If the published event queue is not a persistent event queue, and the event object is not parameterized to be persistent, the first subscriber that processes the event object will consume it and the event object will be removed from the event queue and not be available to other subscribers to the published event queue.

New event queue properties can be created automatically. If an event object that contains a new property (e.g., "author") is the first event object containing that property to be placed into that event queue, then the property is added to the event queue's list of properties. As new rules or services are created, this allows producer services and other event object sources to "learn" to automatically associate event objects with one or more event queues.

Examples of event queues, and some of the parameters that can be associated with each, include:
Stock Quotes (price, symbol, date/time, financial index)
World News (date/time, title, full story text, URL)
Call Center (location, date/time, representative, activity)
Business News (date/time, title, full story text, URL)
Community News (date/time, location, title, full story text, URL)
Security Gate (date/time, location, license plate number, license plate state)
Weather News (date/time, location, title, full story text, URL)
Network and Server (server name, network IP, date/time, location)
Bank Transactions (bank name, date/time, activity)
Credit Card Transactions (credit card type, balance, credit limit, date/time, limit)

2.5.5 Viewing Events

One aspect of the present invention is to allow a user to view event objects currently in the system. Using an exemplary web interface, a user can select one or more views of event objects using the following procedure:

Step 4. Select "View>Events>All Events" in the navigation menu. All of the events in the system, that the user has access rights to view, are displayed. Each event is shown with a unique ID number.

Step 5. Select sort preferences by use of the "View>Events>Sort" option in the navigation menu. By default, event objects are sorted by timestamp. The sort order can be altered to sort event objects by other mechanisms, such as based on parameters (persistent/not persistent, topic specification, producer service that created the event object, etc.), by event queue, by owner of the PPS used to collect the information that was used to generate the event object, or by other means.

Step 6. Use "next" and "previous" controls, or other well understood means, to navigate between screens if the presented events are too numerous to fit on a single screen.

An example event object list provides the following information:
ID—Displays the ID number for the event.
Topic—Displays the associated topics for each event.
Properties—Displays the properties that are defined in each event object. For example, a stock.quote event may contain properties for price, date, and symbol.
When—Displays the date and time of the event object timestamp.

2.5.6 Viewing Events by Topic

Embodiments of the present invention can process millions of event objects per day and could produce many screens of seemingly random event objects. To reduce the event objects displayed to a usable subset, a capability for viewing event objects filtered by topic is provided. For example, if the user is only interested in seeing event objects related to stock prices, they can use the following procedure:

Step 1. Select "View>Events>by Topic" in the navigation menu. All of the topics used by any events in the system, that the user has access rights to view, are displayed.

Step 2. Select the topic, or topics, of interest (such as "Stock Quotes"), or specify the topic or topics of interest by entering them explicitly. The system displays all event objects that include the specified topic or topics, from among the events currently in the system that the user has access rights to view.

Step 3. Sort preferences are selected by use of the "View>Events>Sort" option in the navigation menu. By default, event objects are sorted by timestamp. The sort order can be altered to sort event objects by other mechanisms, such as based on parameters (persistent/not persistent, topic specification, producer service that created the event object, etc.), by event queue, by owner of the PPS used to collect the information that was used to generate the event object, or by other means.

Step 4. The user can use "next" and "previous" controls, or other well understood means to navigate between screens if the presented events are too numerous to fit on a single screen.

2.5.7 Viewing Event Queues

The exemplary implementation of the present invention includes the ability to view event queues that there are sufficient access rights to. Access rights are defined using access control lists, as described herein. Access rights required to view a given event queue are defined as part of the event queue definition. In an illustrative embodiment, the following steps may be carried out to view all event queues:

Step 1. Select "View>Event Queues" in the navigation menu. All event queues that there are sufficient access rights for are displayed.

Step 2. Sort preferences are selected by use of the "View>Event Queues>Sort" option in the navigation menu. By default, event queues are sorted alphabetically by name. The sort order can be altered to sort event queues displayed by other mechanisms, such as based on event queue parameters (topic specification, access rights required, producer services that supply event objects to the queue, etc.), by number of event objects in the queue, by owner of the event queue, or by other means.

Step 3. The user can use "next" and "previous" controls, or other well-understood means to navigate between screens if the presented event queues are too numerous to fit on a single screen.

The Event Queues screen lists all of the event queues that are visible to the user, showing the following information for each event queue:

Name—Displays the event queue name.

Description—Displays a brief description of the event queue.

Properties—Displays the list of properties defined for the event queue.

Events/Day—Displays how many events are typically generated for the event queue each day.

Last Modified—Displays the date and time the event queue was last modified.

Persistent/non-Persistent—Displays whether the event queue holds persistent event objects or not.

Status—Displays the current status of the event queue.

The properties section provides information that can be used in determining the relevance of the event queue property to the event objects in the event queue. For each property, a count, frequency, and percentage are displayed.

Count—Displays the number of times the property has matched a rule since the event queue was created. This count can be reset (see "Resetting a Property Count" below).

Frequency—Displays the number of rule matches per hour for the property.

Percent—Displays how often the property has matched a rule in comparison with the event queue's total rule match count. For example, an event queue can have 100 rule matches and a specific property can match 80% of those rule matches.

The count, frequency, and percentage information can be used to aid in writing rules that have a greater chance of matching. For example, if use of a "title" property results in 80% of rule matches and a "headline" property only matches in 30% of rule matches, a user can use this information to determine that writing a rule using "title" rather than "headline" is more likely to result in a rule that matches event objects in the queue.

2.5.8 Creating Event Queues

Most often, new event queues are created through services and properties are created automatically as previously described. However, a user can use the "New>Topic" feature to create a new event queue manually. In an illustrative embodiment, the following steps may be carried out by a user to create a new event queue:

Step 1. Select "New>Event Queue", which causes a New Event Queue screen to appear with fields to fill in to define the parameters and other aspects of the new event queue.

Step 2. Enter the name and description of the event queue.

Step 3. Specify initial properties for the event queue in the "Properties" section. If an incoming event object contains properties not already associated with the event queue, the properties are automatically added to the event queue in addition to those specified initially.

Step 4. Select "Create" to create the event queue in the current workspace.

2.5.9 Disabling or Deleting an Event Queue

A user with the required access rights can disable or delete event queues. Disabling an event queue does not remove the event queue from the system; the event queue still appears in the event queue display and can be reactivated. A deleted event queue is removed from the system In an illustrative embodiment, the following steps may be carried out to disable or delete an existing event queue:

Step 1. Select "Delete>Event Queue", from the navigation menu. The Delete Event Queue screen will appear, displaying all event queues that the user has sufficient access rights to disable or delete.

Step 2. Select the event queue, or queues, to disable or delete.

Step 3. Select "disable" to disable the selected event queues, or "delete" to delete the selected event queues.

Step 4. The system requests confirmation of the disablement or deletion, and provides a "Yes" option to confirm the operation, and a "No" option to deny confirmation. If the operation is not confirmed (i.e. "No" is selected), the procedure is aborted and the event queue is not disabled or deleted. If the operation is confirmed (i.e. "Yes" is selected), the system has three possible actions that will be taken. The selection of an action is based on the state of the event queue:

1) If the event queue is not published, and has no subscriptions, the event queue is disabled or deleted.

2) If the event queue is not published, but has subscriptions (i.e. the event queue was published in the past, and has been subscribed to at that time), an event queue disablement fails, the IDs of the subscribing workspaces are provided, and the operation is aborted, but an event queue deletion results in the event queue being removed from the current workspace and marked "pending delete" by the system. The event queue is not deleted immediately in this case.

3) If the event queue is published by another user, role or workspace, and has been subscribed to for the current workspace, and the operation was to delete the event queue, the subscription is cancelled, but the event queue is otherwise not affected, unless the event queue is marked "pending delete" and this was the last subscription to the said event queue, in which case the event queue is deleted. If the event queue has been subscribed to for the current workspace, and the operation is to disable the event queue, the event queue is marked as disabled for the current workspace and event processing flows the workspace is processing, but the event queue is not affected for other users.

2.5.10 Testing with User Entered Events

After a user creates a new RS, an event object may not be immediately available to test the rule. The user can manually create an event object and customize the event object to match the new rule's conditions. For example, if the new rule invokes a response when stock symbol "MSFT" exceeds $90, the user can create an event object manually and specify MSFT as the symbol and $100 as the price to ensure that the response occurs as intended.

Two methods are available for creating custom events.
Create a new event from scratch
Copy and save an existing event 2.5.10.1 Creating a New Event from Scratch The "New Event" screen is used to customize an event that can be used to test a new rule:

Step 1. In the navigation menu, select "New>Event", which causes the New Event screen to appear.
Step 2. Enters the same event queue name as defined in the new RS for event source.
Step 3. Specifies the expiration date of the event. If the event is only being used for test purposes, the user can specify that the event expires in 1 hour.
Step 4. Enter the properties and values to match those in the new RS's rule definition.
Step 5. Add additional properties as desired.
Step 6. Select "Save" to create the event object and insert it into the specified queue.

2.5.10.2 Copying an Existing Event

The "Copy Event" screen is used to customize an existing event object that can be used to test a new rule. Perform the following steps to copy an existing event object:

Step 1. In the navigation menu, select "View>Events>All Events". All of the event objects in the system, that the user has access rights to view, are displayed.
Step 2. Select an event object to copy.
Step 3. Select "Copy". The selected event will be displayed in a New Event screen, as above.
Step 4. The user modifies the event object properties as necessary. It is possible to change any existing properties so that they match the new rule. If necessary, a property can be deleted.
Step 5. When all changes are complete, the user clicks Save and the event object is created and inserted into the event queue specified.

2.5.11 Event Auditing

The system provides for auditing of event objects, event queues, and response actions, including access attempts, event object creation, event object insertion into event queues and other aspects of the operation of the system. The auditing mechanism creates logs of event actions that can be reviewed by appropriately authorized users.

2.6 Watch Lists

A watch list is a set of stored data items. The watch list is stored as a single object with a unique user-defined name. The name can be specified within a specified namespace, or sans namespace. If the watch list is not associated with a specific namespace, it will use the default namespace of the workspace it is bound to. The watch list name can be added to a rule and the rule will reference the data stored in the watch list object. The benefit is that a user can modify the data within the watch list at any time and the rule does not have to change. This is particularly useful when the rule is published and shared by a plurality of workspaces. If the rule does not specify a namespace for the watch list, each subscriber to the rule will be able to create their own watch list, and the shared rule will reference each subscriber's individual watch list to obtain the referenced watch list data.

For example, if a user wants to create several rules regarding their stock portfolio, they can create a watch list with all of their stocks. When a user creates a rule, they use the watch list rather than each individual stock symbol. Then, in the future, if the user's stock portfolio changes, they can modify the watch list and every rule will automatically use their updated portfolio. If the rule is published, and does not specify a namespace for the watch list, each subscriber to the rule can create their own watch list, and when the rule is evaluated, the watch list will take on the default namespace of the workspace the rule is subscribed from, and the user's local watch list will be referenced. The published rule will then be referencing different lists of stock symbols for each subscriber, and each subscriber can update their watch list of stock symbols at any time without requiring changes to the RS or having any effect on other users or workspaces.

A watch list can be stored in an instance of the database, a local storage location, a shared directory service, a RuleBook or by other means as determined to be proper by those having skill in the art.

2.6.1 Creating a New Watch List

In an illustrative embodiment, the following steps may be carried out to create a new watch list:

Step 1. Select "New>Watch List" in the navigation menu. The "New Watch List" screen appears.
Step 2. The user specifies the type of watch list to create. To create the watch list as a text string, "Text" is selected. To create the watch list as a list of items, "List" is selected.
Step 3. The text or the list of items is entered.
Step 4. The name and description of the watch list is entered.
Step 5. The status as of the watch list is set to "active".
Step 6. "Save" is selected, and the watch list is created and saved to non-volatile storage so that it will continue to exist after system reboots or otherwise resets.

2.7 Services and Service Interfaces

A service is a configurable object that can be identified within the system by a unique identifier, and started and stopped. Services are executable programs that run as part of the system. They include the service, a configuration, and an optional name.

The rules engine is dependent on external services to produce events and respond to them.

Services are sometimes used to interact with the computer systems or networks external to the system of the invention, collecting data and inputting that data into the system of the invention in the form of event objects. A user can create and configure different services for a variety of data types, such as network monitors, news feeds, financial transactions, and so on. After a service is created, the user can schedule the service to run at any time and interval (e.g., 1 time every 30 minutes, every other day, the first day of the month, etc.). This type of service is called a producer service. Specifically, a producer service is a service that is configured by a PPS and can be scheduled to run at specific times. An example of a producer service is a news reader that extracts events from an RSS or Atom news feed.

Services are sometimes used to produce actions in computer systems or networks external to the system of the invention, such as by generating email messages or changes in databases. A user can create and configure different services for a variety of interaction types, such as sending an email, writing data to a log file, activating an alarm or updating a database. After this type of service is created, the user can configure the service to respond to one or more events by specifying the service as the response defined for a rule. Specifically, a responder service is a service that carries out a response for an underlying service, such as an analytic service. An example of a responder is an email service that sends email messages to notify specific users of the occurrence of particular events. A response is a named service configuration. Responses are specified within rules to specify actions to take when rules match specific events.

Services are sometimes used to manipulate information within the system of the invention. These types of services can be used for event enhancement, to perform calculations, do research, or for other tasks. After this type of service is created, the user can configure the service for use by one or more rules. Specifically, an analytic service is a service that implements a data processing function. An example of an analytic service is a match function that analyzes a set of input elements and returns a true or false result if all elements do or do not match specified criteria.

Services can be producers, analytics or responders. A service can be both a producer and a responder. For example, when an event object requires enrichment by the addition of additional information, the responder for the rule that determines the need for further event enrichment can be a producer service that acquires the additional information. A service can be referenced as part of a PPS.

A user with the proper permissions can create, modify, configure, schedule, disable or delete services. Disabling a service does not remove the service from the system; the service still appears in the service list and can be reactivated.

2.7.1 Example Services

Event objects are generated through producer services that are configured and scheduled using embodiments of the present invention. A multitude of producer services can be configured to access outside information sources of many different types, such as RSS feeds, data monitors, databases, web pages, and computer systems.

Example producer services include those that interface to:
Email services, including pop, imap, and SMTP-based services.
SMS services, that take SMS messages and produce events.
RSS producer services, that take an RSS feed and process it to produce events.
IM services, that take IM messages and process them to produce events.
HTTP services, that take information from a web page and processes it to produce events.
Database services, that perform queries against a database and process the results to produce events.
File monitor services that monitor file system events and file contents and process the results to produce events.
Real Time Alert Manager (RTAM) services.
EAS Agent Service.

2.7.1.1 EAS Agent Service

This service communicates with an Enterprise Agent Server (EAS) to offer the following capabilities:
Respond by executing an EAS agent or source asynchronously.
Execute an EAS source/object/agent and raise the response as an event object of the present invention.

The service configuration defines the properties needed to invoke an agent:
name of the agent to run
event parameters The EAS Agent Service is configured on initialization with the URL of the EAS Execution Servlet. When its respond method is invoked, the EAS Agent Service reads the requested agent name from the Response object, along with any other properties defined by the response object. The service then does an HTTP POST to the EAS Execution Servlet URL, with parameter agentName equal to the specified name. The service encodes all available event properties as form parameters. The EAS Execution Servlet makes those HTTP form-post properties available to the agent as event parameters. For example, if the AgentService sets a price parameter equal to 10, EAS will set $event-param:price$ to 10.

2.7.1.2 RTAM Service

This service communicates with a Real-Time Alert Manager (RTAM) server instance to offer the following capabilities:
Respond to a situation by submitting an alert to RTAM
Produce event objects for any observed RTAM alerts 2.7.1.3 Email Service This service provides SMTP, POP, and IMAP interfaces to the system. It permits the system to:
Respond to a situation by sending an e-mail
Produce event objects by checking an e-mail inbox
The service configuration defines the mail server, account/mailbox, and authentication information necessary to communicate with the mail system.

2.7.1.4 Instant Messaging Service

The instant messaging service maps Jabber/XMPP messages and presence events to and from the system. This service leverages the Jabber IM service to:
Respond to a situation by sending a Jabber message
Produce event objects by checking an e-mail inbox
The Jabber server can be configured to provide transports to other messaging services such as AOL Instant Messenger, MSN Messenger, IRC, etc. Jabber/XMPP is a product of the Jabber Software Foundation of Denver, Colo.

2.7.1.5 URL Service—http, ftp, file, etc.

A generic change listener built on the Apache Commons VFS product from the Apache Software Foundation of Forest Hill, Md., allows users to:
Respond to a situation by executing a file write, http post, ftp put, etc.
Produce an event object by reading a web page, ftp location, file, etc. and returning its result The VFS API supports many common file systems (for example, local file, CIFS/Windows networking, FTP, HTTP, HTTPS, SFTP, temporary files, webdav, zip, jar, gzip, bzip2). It is a "dumb" retrieval/comparison algorithm, and submits the entire document when the document changes.

Alternatively, the URL Change Listener can delegate its services to lower-level change listeners that understand the most efficient ways to detect changes in their domain. The HTTP Change Listener is one example where greater efficiency can be attained by leveraging protocol-specific features.

2.7.1.6 HTTP Change Listener Service

An HTTP change listener leverages HTTP protocol-specific features to efficiently determine when a web page has changed. Examples are ETag/If-Match, and If-Modified-Since. Those headers lets the user ask the web server if the page has changed since the last time the user retrieved the page, and the headers are a much more intelligent way to determine web page changes than downloading and comparing locally.

2.7.1.7 Database Service—http, ftp, file, etc.

This service allows embodiments of the present invention to interact with a database through a JDBC driver. Each service instance is pre-configured with a JDBC driver, connection string, and so on and accepts the following tasks:

Respond to a situation by running a database query (typically INSERT, UPDATE, etc.)

Produce an event object by reading the result of a database query (typically SELECT)

Multiple databases can be handled with separate instances of the Database Service.

2.7.1.8 RSS Producer Service

An RSS producer service is an RSS listener that subscribes to one or more RSS feeds, and monitors each feed for RSS feed items (such as news stories). The RSS producer service uses configuration information, such as a PPS, to define one or more feeds and to make the RSS association for these feeds. The RSS producer service receives each feed and processes the feed, looking for items in the feed.

The RSS producer service can be optionally configured to generate an event object for each item found in the feed, to generate an event object for each new item found in the feed, or to generate an event object for each item in the feed that matches one or more defined pre-processing rules. For each feed item identified as requiring an event object, the RSS producer service generates one or more event objects. These event objects can be tagged with one or more topics, as defined by the PPS, or determined by pre-processing rules.

2.7.1.9 File Monitor Service

A windows file system listener watches a directory recursively for any changes within that directory tree; or the file system listener can watch a single file for changes. When changes occur, the file system listener POSTs the file metadata and content using the HTTP REST interface.

2.7.2 Service Properties

Services have properties associated with them. Some example properties include:

Name—Displays the name and description of the service.
Type—Displays the type of service.
Owner—Displays the user who created the service.
Status—Displays the current status of the service (e.g. enabled/disabled).
Schedule—Displays the service schedule. The schedule includes a start time, end time, repeat count, and a repeat interval.

2.7.3 Portable Service Definitions

The system provides for the creation and use of portable service definitions. Portable service definitions include configuration and naming for producers, responders (e.g. responses), and analytics, and can be stored in a database instance, on a local disk, in configuration materials, in a RuleBook, or other locations as is convenient. In some embodiments, a portable service definition references or includes a specific instance of an executable program that provides a service. A portable service definition used to configure a producer service is known as a "Portable Producer Specification" (PPS).

2.7.4 Scheduling a Service

Producer and response services can be scheduled as to when they run. Schedules do not apply to analytic services. Scheduling a service causes the service to run on a periodic basis to collect information from information sources or to process any responses that have been queued for delayed execution.

In an illustrative embodiment, the following steps may be carried out by a user to schedule a specific service:

Step 1. Select "Services>All Services", which causes the "Services" screen to appear.

Step 2. Select the service to schedule. This causes the "Schedules" screen to appear. If no schedule currently exists, or if the service is newly created, the schedule section can be used to set a start time, end time, and an interval for the selected service. The format used for the "Start Time" and "End Time" fields is implementation dependent, but can be, for example, "yyyy/mm/dd hh:mm:ssAM (or PM)", such as "2006/07/31 10:04:03AM"

Step 3. The "Repeat Count" field, is used to specify how many times the schedule is to be run.

Step 4. The "Repeat Every" field is used to specify the time interval between each scheduled execution of the service.

Step 5. Select "Save Schedule" to cause the schedule to be set as entered.

In an exemplary embodiment, a schedule starts on Dec. 11, 2006 at 12:32:42 AM and ends at 11:59:59 PM. The schedule will run once every hour.

After a service is scheduled, the service will run at the designated time and interval, producing or processing event objects.

2.7.5 Creating a Producer Service

A producer service is a service that generates event objects. Producer services are configured by specification of a Portable Producer Specification (PPS) and can be scheduled to run at specific times or intervals. An example of a producer service is a news reader that extracts events from an RSS or Atom news feed. In an illustrative embodiment, the following steps may be carried out to create a new producer service:

Step 1. Select "New>Service" from the navigation menu.

Step 2. From the drop-down menu, select "producer" to display only those service types that produce event objects. Each service type is followed by a brief description.

Step 3. Select the service type to create. The "New Service" screen appears and displays the properties for the type of service selected for creation. For example, a news feed service requires a URL; an IM service requires a user name, password and server. All producers require a name and a PPS.

Step 4. Enter the name and description of the new service.

Step 5. Enters the remaining information required for the service type, such as access parameters to the PPS and/or the data collected by the producer service, whether the PPS should be published or not, and values for other parameters stored in the PPS.

Step 6. Select "Save", which causes the PPS to be saved with the specified values, and the "View Service" screen to appear, where the user can schedule the new service. (See "Schedule a Service" above.)

2.7.6 Analytics

An analytic is a service that provides a function. The analytic can provide a simple function (like in an API) or can be a more complex service that connects to a remote server and performs some processing before returning. The implementation details are transparent to the user and to the query language. A service that implements the Analytic interface can be plugged into a system of the present invention for use within a query language specification as analytical functions. Here, the basic analytics are described and it is demonstrated how they can be used within a query language statement.

Examples include Inxight, Metacarta GeoTagger, and so on (anything that needs to establish or verify a connection with a remote service).

Analytics are called from the rule definition language. The query language syntax is:

analyticname(operand1{,operand2, . . . })

EXAMPLES

```
categorize(message.text)
intersects(point,region)
WHEN message WITH categorize(text) HAS 'weapons'
```

2.7.6.1 Match Analytic

The Match analytic determines whether all input objects are equal.

Example 1

Assume the analytic is deployed in an analytics BeanContext with the name "match". A user enters the following rule:
WHEN 3 'stock quote' WITH match (symbol) THEN . . .

The "symbol" identifier used above means the set of symbol properties from the selection of 3 stock quotes. The match analytic operates on that set. The embodiments of the invention pass the match analytic a Collection of symbol properties. The match analytic returns a single Boolean result—true if all the input symbols are equal.

Example 2

```
WHEN 'press release' p, 3 'stock quote' s, WITH
match(p.company_symbol, s.symbol) THEN . . .
```

In this case, match operates on a single string property p.company_symbol and a set of 3 properties s.symbol. The engine flattens the inputs and calls analyze with a Collection containing p.company_symbol and the 3 symbols from s. The result of match is true if all 4 elements of the Collection are equal.

2.7.6.2 Range Analytic

The Range analytic computes the range of a collection of numbers (the difference between the largest input and the smallest input).

Example

```
WHEN 3 'stock quote' WITH symbol='EBAY', range(price) > 5
THEN . . .
```

Parameters: 3 events from the 'stock quote' topic
Condition 1: symbol='EBAY'
Condition 2: range(price)>5

To implement the second condition, various embodiments of the invention analyze the range of the price properties in the parameter set. The range analytic can operate on that set. The various embodiments of the invention pass a Collection of Double objects to the range analytic, which returns the absolute value of the difference between the largest input and the smallest input. If that value is greater than 5, the expression is true.

2.7.6.3 Count Analytic

The Count analytic returns the number of input elements—implemented as Collection.size( ).

Example: Assume the analytic is deployed in an analytics BeanContext with the name count. A user enters the following rule:
WHEN 5 'stock quote' WITH count (symbol)=5 THEN . . .

The result is the number of symbol properties encountered in the input set. In this case, the condition is true if all 5 input events have a symbol property. If any of them are missing the property, the condition will be false.

2.7.6.4 Xpath Analytic

The Xpath analytic returns the result specified by the xpath—implemented using Apache Commons' JXPath. An object base is optional: if unspecified, the enclosing event is the object base.

Signature:
xpath({object base,} string xpath}

Example: Assume the analytic is deployed in an analytics BeanContext with the name xpath. A user enters the following rule:

```
WHEN 'new document' WITH
xpath("/document/summary/country/text( )")
contains "iraq" THEN . . .
```

Optionally, one of the event's properties can be passed to the analytic as the base object.

```
WHEN 'new document' WITH xpath(content,"/summary/country/text( )")
contains "iraq" THEN ...
```

In this case the xpath is computed starting at the content property.

2.7.6.5 Regex Analytic

The Regex analytic returns a set of substrings of object. toString( ) that match the specified regex. If the base object is unspecified, the enclosing event is the base object.

Signature:
regex({object base,} string regex}

Example 1

Assume the analytic is deployed in an analytics BeanContext with the name regex. A user enters the following rule:
WHEN 'new document' WITH contains regex ("ab.*") THEN . . .

The xpath starts with the 'new document' event, calls the toString( ) method on the 'new document', searches the document for the regex pattern "ab.*", and returns a set of strings from the matching country nodes.

Example 2

```
WHEN 'new document' WITH contains regex(content, "ab.*")
THEN . . .
```

This example is the same except it runs the regex on the "content" property of the event, instead of the event itself.

2.7.6.6 Text Processing Analytics

Custom analytics also can be developed, using Inxight, ANNIE, and so on.

| Analytic | Input | Returns | Description | Uses |
| --- | --- | --- | --- | --- |
| extract-entities | string | set | Finds entities in the input | Inxight |
| categorize | string | set | Returns a set of categories | Inxight |
| summarize | string | set | Returns a summary of the input | Inxight |

2.7.6.7 Spatial Analytics

Spatial Analytics operate on geospatial points and regions.
intersection
union
difference
symmetric difference
convex hull
buffer

2.7.6.8 Creating an Analytic

An analytic service is a service that implements a data processor that can be plugged into a rule definition. An example of an analytic service is a match function that analyzes a set of input elements and returns a true or false if all elements match. In an illustrative embodiment, the following steps may be carried out to create a new analytic:

Step 1. Select "Services>New Service".
Step 2. Select "analytic" to display only those service types that analyze event objects. Each service type is followed by a brief description.
Step 3. Select or enter the name of the service type to create, which causes the "New Service" screen to appear.
Step 4. Enter a name and description for the service.
Step 5. Select "Save".

2.7.7 Responses

Responses are initiated as part of rule evaluation. Response capabilities include the following:

Provide users with notifications/alerts through channels such as email, IM, and web browser based on detected events.
Automatically respond to data events across disparate systems based on user-defined rules by initiating transactions, triggering existing workflow systems, and interacting with remote web services.
Deliver contextual alerts that include related queries from other sources.
Intelligently and automatically open up applications such as GIS mapping environments, analytic tools, and multimedia viewers on end-user desktops based on server events without requiring client download.
Display changing data from underlying systems to real-time web browser screens without requiring client download.
Facilitate rapid response to notifications/alerts with return-receipt tracking, time-based escalation, and "one-click" buttons within alerts that trigger actions.

Rules invoke responses to event conditions by invoking a pre-defined Response or by invoking a Responder Service. For example, a response can be an email to a specific user to notify that user of a specific event. Responses defined in the Response user interface can be defined as templates where all or some fields can be left blank. Response definitions can be stored in a database, in a RuleBook, in configuration materials, or locally within each instance of the system.

When the user inserts a response into a rule, the response parameters can be defined at that time. However, in the response user interface, the user can specify key properties to be used as default values when the response is added to a rule. For example, in an email response, the user can specify a CC or BCC property where a specific user or account will receive copies of all the emails sent through that response.

Some examples of responses include:
Email Message—Generic email with default values: to, from, subject, and body.
IM Message—Generic IM with default values: screen name and message text.
EAS Agent—Generic Agent with default values: agent name, namespace, and login information.
RTAM Alert—Generic RTAM alert with default values: to, from, subject, channel, and priority.

Users with the proper access rights can disable or delete a response from the Edit Response screen. Disabling a response does not remove the response from the system; the response will still appear in the response list and can be re-activated. A deleted response is removed from the system and cannot be re-activated. Rules employing disabled or deleted responses do not match event objects in the rules engine.

2.7.7.1 Creating Responses

A user can create several responses for each service type. For example, if a user selects mailto, he can create several different email responses, each used in a different scenario. For example, each email response can specify a different default subject and body. In an illustrative embodiment, the following steps may be carried out to create a new response:

Step 1. Select "New>Response" from the navigation menu. The "Create Response" screen will appear. This screen lists all of the available services for which new responses can be created.
Step 2. Select or enter the name of the service for which to create the response. The "New Response" screen appears. The New Response screen is used to define the properties of the new response. There is no need to enter values for all properties. Only the "Name" value is required. Undefined property values can be entered when using the response for creating rules. However, if the value of a property is defined, it is the default unless overridden in an RS.
Step 3. Enter a name and description for the response. The name should easily identify the response so that the user can recognize it as it appears in the system (e.g., when creating rules).
Step 4. Depending on which type of response is being created, define the required parameters. For example, if an instant message response is being created, specify "To:", "Subject:", and "Message Body:". Any or all parameters can be left blank, depending on how the response is to be used.
Step 5. Select "Save" to save the ne response definition.

2.7.7.2 Creating a Response from Existing Service

The "New Response" screen is used to convert a selected service into a response. In some implementations, only Responders and Producer/Responders can be converted into Responses. Thereafter, the user can add this response as part of a new rule.

In an illustrative embodiment, the following steps may be carried out to create a response from an existing service, the user performs the following steps:

Step 1. Select "Services>All Services", which causes the "Services" screen to appear.

Step 2. Select the name of the service from which to create a response in the "Responders" list, which causes the service details screen to appear.

Step 3. Select "New", which causes the "New Response" screen to appear.

Step 4. A name and a description of the response are entered. The name should easily identify the response so that the user can recognize it as it appears in the system (e.g., when creating rules).

Step 5. Depending on which type of response is being created, define the required fields. For example, if an instant message response is being created, specify "To:", "Subject:", and "Message Body:".

Step 6. Any or all parameters can be left blank, depending on how the response will be used. An exemplary embodiment shows a stock quote instant message response where only a subject parameter is defined. This response can be used in any rule specific to stock quote price alerts and the rule creator only needs to define the "To:" and "Message Body:" parameters.

Step 7. Select "Save" to save the created response service.

2.8 Rules Engine

The rules engine processes rules. The rules engine includes interfaces for propagating event objects into and out of the engine, parsing and creating rules, and tracking partial rule evaluations. Event objects are detected automatically through activation of user-defined rules that are configured within the various embodiments of the present invention.

Event detection capabilities of the rules engine include the following:

Cross-references, filters, and correlates events as represented by event objects over time, geography, and across disparate sources to detect complex events.

Leverages third party entity extraction, natural language processing, and categorization engines as a part of complex event processing flows.

Allows end users to define personalized rules and subscription criteria for Event Detection and Response.

The rules engine, upon initialization, loads RSs from workspaces, RuleBooks and other storage locations configured for the rules engine. The rules engine identifies the RSs, watch lists, and other components that must be loaded on the basis of one or more configuration materials. Each identified component is located, and loaded into the rules engine, translated from its storage or transportable format to an in-memory form, and stored within the memory of the rules engine. Internal event queues are also loaded as necessary to re-establish the historical context of the rules engine.

At this time the rules engine is ready to start processing events. The rules engine then registers to receive event objects from event queues and begins processing the event objects it receives.

For each event object received, the rules engine evaluates each enabled rule to determine whether the rule matches the current event object. If no match occurs, the rules engine has completed processing the event object. If one or more matches occur, the rules engine selects the rules to be processed and then processes them. Rules associated with disabled or deleted topics are not matched. Similarly, disabled rules are not processed either. Each rule is processed by evaluating the rule and executing the proper response if the rule matches. The response is specified as part of the RS as described above and below.

The rules engine evaluates event objects in several ways. A first method of event object evaluation is instant analysis of an event object when the event object is received. This method of evaluation provides for near-real time detection of specific events, and is implemented using simple tests for event object properties matching an expression with the immediate generation of a response when a match occurs. A second method of event object evaluation is the evaluation of an event object in context of other event objects. This method of evaluation provides for recognizing a series or collection of related events, such as "IF event A has occurred and event B has occurred, then make an appropriate response." A third method of event evaluation is the evaluation of an event object for membership in partially completed event series. Thus, if a rule specifies that a specific event should occur four times in an hour before a response is instigated, each incoming event object must be evaluated against other event objects of the same type that have occurred in the recent past. The rules engine uses internal event queues, watch lists, or database persistence to store the historical event objects for subsequent evaluation as described above.

2.8.1 Rules

The system provides for robust user-created rule authoring and sharing through formulas, wizards, and templates. User-created rules created by a first user can be published and shared with, or exported for transport to, one or more additional second user(s) in a variety of ways, including:

the immediate re-use of the published shared rules by the second user(s), the use of the published shared rules as a template for additional rules and techniques authored by the second user(s), the aggregation of rules into one or more RuleBooks and the RuleBooks made available to one or more second user(s) by publishing them, and the second user(s) subscribing to them, or exporting them for transport to the second user(s) for import, the aggregation of shared rules into part of an information collection infrastructure, and making available to one or more second user(s), as an event queue or queues, of aggregated information resulting from the application of one or more rules operating against at least one event object.

By supporting user-created rules and event queues, the system permits individual users to create rules and event queues that translate their own information processing techniques into sharable, automated resources. These resources are made available to additional users by the capabilities supported by the system. The system thus supports knowledge and information sharing on a variety of fronts, including the sharing of rules, analytic structures, and resulting collections of pre-processed information. Rules can be taken from a database, a directory, shared files, or other storage means known to those skilled in the art. In some embodiments, groups of rules can be used together. These rules also can be obtained from RuleBooks of sharable and transportable rules and recipes, can be associated as part of a larger rule, or can be individually provided. User-created rules can also be exported and transported to other instances of the system, such as when providing a business service comprising provision of rules and RuleBooks, or when suggesting topics for classifying information feeds.

Rules are used to analyze event objects based on specific conditions, and then to invoke responses when conditions match. For example, when a producer service (e.g. from reading a news feed) creates an event object that matches a specific condition (e.g., the news content contains "London"), the rule evaluation then invokes a specific response (e.g., send an email).

The current invention provides for use of Rule Wizards that step users through the processes of selecting event queues and/or topics, rule specifications, and associated responses. Templates also can be provided by a user with appropriate access rights so the user simply inputs key values. Finally, the user can input rule text manually; however, this feature is for advanced users only.

Previously defined rules can be disabled, either by the system or a user with appropriate access rights. Disabling a rule does not remove the rule from the system; the rule will still appear in the rule list and can be reactivated.

2.8.2 Rules Wizards

The Rule Wizard steps the user through the process of selecting event queues and/or topics, rule definitions, and associated responses. To help assist the user in creating rules using the Rule Wizard, an auto complete function is available, which helps the user select topics and properties.

In an illustrative embodiment, the following steps may be carried out to create a rule using the Rule Wizard:

Step 1. Select "New>Rule From Wizard", which causes the Rule Wizard screen to appear.

Step 2. Enter the name and description of the new rule that clearly states the purpose of the rule and distinguishes it from all other rules.

Step 3. Select or enter the event queue(s) and/or topic(s) that will provide event objects for the rule to evaluate.

Step 4. Specify the Occurrences value, which defines how many times events must occur that match the rule definition before the rule activates its response. For example, if a stock price drops a certain percentage 5 times, the rule will activate.

Step 5. Specify the Within value, that specifies a time frame in which the rule must be activated for the response to be executed. For example, if a stock price drops a certain percentage within 1 hour, the rule activates.

Step 6. Defines the conditions that event objects must match for the response to be activated. In some embodiments, at least two parameters must be defined for each condition. A parameter can be an existing event queue, topic, watch list, or a constant value. The operator is a function between two or more parameters. For example, x=y, or x>y. If the function is true, then the rule is activated. Analytical functions can be added to the rule definition. For example, the user can add the range analytic to return the absolute value of the difference between the largest input and the smallest input.

Step 7. Select the responses to apply to a rule. In some embodiments of the invention, at least one response must be created before creating a rule.

Step 8. When the response to use in the rule is selected, the default parameters and values in the response can be accepted, or new ones can be specified. Values defined in the RS override default values in the original response. For example, the user can specify a new email address for an email response.

Step 9. Select "Save" to create the RS and save it to the current workspace.

Step 10. The "View Rule" screen appears with a summary of the rule created by the Rule Wizard.

2.8.3 Rule Templates

Rule Templates are an alternative method to create new rules. A user with appropriate access privileges can create templates representing common scenarios, such as news event alerts, stock quote price checks, and credit card transaction monitoring. A user then can select one of these pre-existing templates and follow the instructions below to create a rule.

In an illustrative embodiment, the following steps may be carried out to create a rule using a template:

Step 1. Select "New>Rule Using a Template", which causes the "Templates" screen to appear and list the existing templates that are available given the available access rights.

Step 2. Select or enter the name of the desired template to use, which causes the "New Rule" screen to appear.

Step 3. In the Parameters section, define each variable. Next to each text box is the expected value type (e.g., dollar amount, text, email address, and so on).

Step 4. In the "Save Statement" section, enter a name and description for the new rule. The name and description should clearly identify the rule and describe the purpose of the rule.

Step 5. Select "Save" to create the RS and save it to the current workspace.

2.8.4 Rule Structures

Rule definitions leverage if/then/else statements, keyword/pattern matching, statistical processing, Boolean logic, over-time correlation, geospatial analysis, automatic cross-referencing against external sources, and more, to identify events. The rules engine uses a query language to analyze multiple events based on joins, temporal (time) windows, spatial regions, and pluggable analytics. The rules engine provides efficient storage and joining of multiple events, while ignoring/expiring old events (those that have surpassed the temporal boundary). Features include:

multiple events can be compared using joins temporal windows ("within 30 minutes", "within 7 days", etc.)

pluggable analytic services

A rule is defined using common computer parseable grammars. The rules engine translates from human-readable forms (e.g. ASCII text) to machine usable formats (e.g. bytecodes). Both formats are considered rules. RSs describe event queues from which to obtain event objects, each with optional selection criteria; rule definitions that specify matching criteria, optional temporal window constraints, etc.; and one or more responses to be executed when the rule is matched. The following are example extensions to SQL that enable the query language to operate with event objects.

| | |
|---|---|
| rule | := WHEN events (WITHIN timeperiod)? THEN responses |
| events | := event (COMMA event)* |
| event | := (count)? topic (alias)? (WITH exprs)? |
| responses | := response (AND response)* |
| response | := (responder \| named_response) target? (WITH params)? |
| responder | := (DO \| RUN \| SEND) name |
| named_response | := name |

Rule definition text inherits characteristics common in existing languages, with some minor differences.

Topics can be dotted identifiers or string literals.

| |
|---|
| topic := identifier ('.' identifier)* \| string_literal |

Analytics, like SQL functions, use parentheses and a comma-delimited parameter list analytic:=identifier '(' expr (',' expr)* ')'

Expressions use SQL-like infix notation and operators: +, −, *, /, AND, OR, NOT, IN, CONTAINS ---
operators := '+' | '−' | '*' | '/' | 'AND' | 'OR' | 'NOT' | 'IN' | 'CONTAINS'

---

Response parameters are specified as a comma-delimited list of key=value pairs.

---
params := param (',' param)*
param := identifier '=' expr

---

Variable Identifiers can use dots to de-reference sub-properties, and can have namespaces to denote different scopes.

---
variable := (namespace ':')? identifier ('.' identifier)*

---

Topic aliases are just identifiers.

alias:=identifier

Identifiers are case-insensitive words that start with a letter (a-z), and then can contain letters (a-z), numbers (0-9), underscore (_) or the at symbol (@)

---
identifier := ('a'..'z') ('a'..'z'| '0'..'9' | '_' | '@' )*

---

String literals nest any sequence of characters inside of matching single-quotes or matching double-quotes.

2.8.4.1 Key-Value Lists

Syntax:

keyvaluelist:=param EQUALS value {, keyvaluelist}

2.8.4.2 Time-Series Calculations

Syntax:

---
within [time-interval]
within 24 hours
within 3 days

---

2.8.4.3 Sequence Calculations

Syntax:

---
when last MY_EVENT
when oldest MY_EVENT
when last 5 MY_EVENT
when oldest 5 MY_EVENT

---

In the above examples, "last" also could be newest, latest, and so on.

2.8.4.4 Set Literal Notation

When a set is to be specified literally in query language, the following syntax is used:

('1', '2', '3', '4')

2.8.4.5 Examples: Stock Quotes

Check all stock quotes.

WHEN stock.quote THEN run agent check-stock

Check only MSFT stock quotes.

---
WHEN stock.quote WITH symbol='MSFT' THEN run agent check-stock

---

Check only stock quotes that match a symbol saved in the user profile.

---
WHEN stock.quote WITH symbol=profile:symbol THEN run agent check-stock

---

Run a check after seeing 3 stock quotes.

WHEN 3 stock.quote THEN run agent check-stock

When 3 stock quotes have matching symbols, check them. The identifier symbol passed into the match analytic is the set of 3 symbol properties from the event selection.

---
WHEN 3 stock.quote WITH match(symbol) THEN run agent check-stock

---

If the stock quotes have a range of more than $5 within a 24-hour time period, sell the stock.

---
WHEN 3 stock.quote WITH match(symbol) AND range(price) > 5 WITHIN 24 hours THEN run agent sellstock

---

2.8.4.6 Examples: News Stories

A list of events with no other constraints.

WHEN news.story, stock.quote THEN run agent scan-story

Using the constraints from Example 1:

---
WHEN news.story, 3 stock.quote WITH match(symbol) AND range(price) >  5
WITHIN 24 hours THEN run agent scan-story

---

Adds constraints to the news.story rule too. Since each event can have its own WITH clause, and any WITH clause can reference another event by its alias, there are multiple approaches possible here. Formatting illustrates the differences.

Each event has a WITH clause. The second WITH uses the alias "s" to reference the first event. This is the preferred method.

```
WHEN 3 stock.quote s WITH match(symbol) AND range(price) > 5,
    news.story WITH content contains s.symbol
    WITHIN 24 hours THEN run agent scan-story
```

Alternatively, place all conditions in the last (stock.quote) WITH clause.

```
WHEN news.story n, 3 stock.quote WITH match(symbol) AND
    range(price) >  5
                          AND n.content
    contains symbol
    WITHIN 24 hours THEN run agent scan-story
```

If event ordering is switched, then the last WITH clause must use different references.

```
WHEN 3 stock.quote s, news.story WITH match(s.symbol) AND
    range(s.price) >  5
                          AND content contains
    s.symbol
    WITHIN 24 hours THEN run agent scan-story
```

2.8.4.7 Examples: Monitoring a Log File

When an error is detected in a log file, restart the affected server.

```
WHEN logfile.change WITH categorize(text) contains 'error'
    THEN run agent rtam/restart-server
```

Here the instruction is to merely check for the existence of a property.

```
WHEN logfile.change lc WITH error
    THEN send email jeoff@agentlogic.com WITH
        subject="Check logfile ${lc.name}", text=lc.content
```

If the log file has no error for 24 hours, have an agent prepare a summary.

```
WHEN not logfile.change WITH error WITHIN 24 hours
    THEN run agent myrole/summarize-logfile
```

2.8.4.8 Examples: Monitor a Military Base Gate for Suspicious Activity

When a "car turned away" event happens twice for the same license plate, email someone to prompt further investigation. In this case c is passed directly into the response, so the response receives a Collection of 2 Event objects.

```
WHEN 2 "car turned away" c WITH match(license_plate)
    THEN run agent gate-alerter with subject="Suspicious Car",
    events=c
```

In this case, c is being included in a template string, so serialize it to a String for inclusion in the template.

```
WHEN 2 "car turned away" c WITH match(license_plate)
    THEN send email guard@gate.com with subject="Suspicious
    Car",
    text="Please examine these suspicious car events: ${c}"
```

2.8.4.9 Examples: Correlate Against a Profile Object

In this case, watchlist is a user profile object.

```
WHEN relationship_change WITH strength >= 60 AND persons IN
    watchlist
    THEN run agent view_watchlist
```

If the relationship_change event itself contains a property named "watchlist," that property will be matched first. Normally the user would know if that is likely to happen. However, to guard against the possibility the default search order can be overridden by explicitly specifying the profile namespace.

```
WHEN relationship_change WITH strength >= 60 AND persons IN
    profile:watchlist
    THEN run agent view_watchlist
```

2.8.5 Namespace Examples

When a variable has no explicit namespace, the default search order at runtime is:
"event" namespace—aliases given to event topics within the current expression
"property" namespace—properties that appear in the event topics referenced by the enclosing WITH expression
"profile" namespace—objects that exist within the user's profile (persistent)

Other than specifying the "profile" namespace for user profile objects, the default namespace search order provides the results users expect about 99% of the time. Following are some esoteric examples that show how the "event" and "property" namespaces work.

2.8.6 Event Aliases Take Precedence Over Properties

Suppose a user assigns an alias price to a topic, but then references an identifier named price within that topic. The default namespace search order checks for matching aliases first, so because an event alias named price exists, any unqualified reference to price is assumed to be referring to that event alias. In other words, the following two query language Statements are equivalent:

```
WHEN stock price WITH price > 10 THEN run agent sell_stock
WHEN stock price WITH event:price > 10 THEN run agent
    sell_stock
```

In practice there is never a need to specify the event namespace, since the event namespace is always searched first. However, in complicated query language statements it can help the user to more easily identify where the property is coming from.

2.8.7 Reference Properties Explicitly

If the user actually meant to refer to a property named price, they probably would not have chosen to use the same name for their event alias. However, if the user really wanted to do so, the property can still be accessed using one of the following two statements, which are equivalent:

```
WHEN stock price WITH price.price > 10 THEN run agent
    sell_stock
WHEN stock price WITH property:price > 10 THEN run agent
    sell_stock
```

2.8.8 Use Property Namespace to Override Event Alias

Below are several, subtly different query language Statements to see how the use of namespaces affect their meaning Here, the second with clause has an unqualified reference to x; the reference is matched to an event alias, because one was declared previously.

```
WHEN topic1 x with ...,
    topic2 y with x.name='Bob' THEN ...
```

This statement has no event alias named x, so the reference to x in the second with clause is assumed to be a property reference.

```
WHEN topic1 y with ...,
    topic2 z with x.name='Bob' THEN ...
```

This example is identical to the first one, except the fact that x is referencing an event is made explicit.

```
WHEN topic1 x with ...,
    topic2 y with event:x.name='Bob' THEN ...
```

If explicitly reference an event alias named x, but no alias named x was ever declared, the result of event:x.name will always be null. For extra credit, a parsing error can be returned to let the user know that they referenced an undeclared event alias.

```
WHEN topic1 y with ...,
    topic2 z with event:x.name='Bob' THEN ...
```

If an event alias x is declared but then it is later desired to reference a property named x, this can be done using the property namespace.

```
WHEN topic1 x with ...,
    topic2 y with property:x.name='Bob' THEN ...
```

The default namespace search order will do what the user expects about 99% of the time. However, the namespace prefix will support those rare cases where specific behavior is required, or where the user wants to explicitly specify all references.

2.8.9 Operator Precedence

Most operators are built-in "binary predicates", meaning they always return a Boolean result. Functions/analytics are the exception. They're listed here in order of precedence, from highest to lowest:

1. Dereference—.
2. Function/Analytic—':' (allow( ) as alternate syntax for SQL junkies?)
3. Boolean Verbs
   Element/set—element in set|set has element|set contains element
   Text comparison—string contains string/regex
   Note that contains is overloaded for both string inputs and sets
4. Boolean Comparators—=, !=, <, >, <=, >=
5. Booleans—AND, OR, NOT, and their alternatives (&, |, !, etc.)

2.8.10 Dereferencing

The .operator has the highest precedence in query language. It can dereference a single object or an entire set of objects, providing a more compact syntax than would otherwise be required for set operations.

If the variable is a set, every element in the set is dereferenced and a new set containing the dereferenced elements is returned. For example:

```
WHEN 5 stock.quote s      <-- declares a 5-element set of
                              stock.quote events with alias "s"
WITH range(s.price) > 5   <-- s.price is the set of all
                              "price" properties in "s"
```

If the variable is a single data element (object), the named property is dereferenced:

```
WHEN stock.quote s        <-- declares a single data
    element with alias "s"
WITH s.price > 20         <-- s.price is just a number, not
                              a set of numbers
```

2.8.11 Built-In Functions

SQL-like built-ins: count, min, max, average (e.g. Calling count:* returns the count of all events in the cache.)

Sequencing—last n, first n, etc.

2.8.12 Response Specification

A rule based on the query language can respond to a given situation by invoking a named Response or by invoking a Responder Service. A named Response is a template that configures a responder service that is previously created by a user and saved with a name. The named Response contains stored values that optionally can be overridden by supplying parameters. Query language also can invoke a Responder Service by name, but passes all the parameters required to successfully create a Response on the fly for that service to invoke.

2.8.12.1 Named Responses

Execute a user's previously created Response by name, optionally specifying parameters that will override what is stored in the saved Response.

```
then "page brad"
then im_joe with message=msg.text
then "send overdue book reminder" holder.email
```

2.8.12.2 Invoke a Responder Service by Name

Execute a Responder service directly by placing DO, RUN, or SEND before the responder name and supply all required parameters.

```
then send im mbecker@jabber.org with message=msg.text
then send email bob@agentlogic.com with subject="whoa",
body=msg.text
then run agent echo-agent with message=msg.text
then run script virus.py with name='klez'
```

Execute multiple responses using AND:
THEN run demo/myagent AND run alerts/youragent

2.8.13 Example Implementations of the Rules System

There are several examples that illustrate the effectiveness and flexibility of the rules mechanisms. A first example provides an alert when a value crosses a threshold, and prevents the alert from repeatedly firing when a value is regularly moving across the threshold value. One issue with alerting on threshold values is that alarms will repeatedly trigger when using a simplistic formula that detects above/below a specific threshold. In the example given of Microsoft stock going below 40, will the alarm repeatedly go off every time Microsoft is reported below 40, or is there a way of saying, only send out a report if the stock was previously above 40?

There are many approaches to ensuring minimal alerting on events related to fluctuating data points and similar types of data. The first is based on correlating amongst only those events that are currently in working memory. Storing copies of events in working memory (in unnamed event queues) works well when the events occur within short time windows (i.e. on the order of hours or days). In this case, we can write a rule which compares the values of the last 2 stock events:

```
When stock firstQuote, stock secondQuote within 60 seconds
where firstQuote.symbol='msft' and match(symbol) and
    firstQuote >= 40 and secondQuote is < 40 then 'Send Alert'
```

The gist of this rule is to say that when an event comes in with a price below 40, only alert me if the previous price was above 40. In other words, this rule fires alerts only at the points in time where the price initially falls below the assigned threshold, and not every occurrence thereafter.

Alternatively, a solution could be implemented using event enrichment to access persisted information. For the stock example, the event would be enriched with the last stock value and the amount of time since the last stock alert was fired. To implement "event enrichment," the rule would be changed to a SQL response that would write the current value of the stock to a column in a database (or to a watch list). This provides database-based persistence of the rule state.

Then, when the next Stock event occurs, the rule is configured to pull previous data from the watch list in the database using the SQL Service.

To ensure the rule is fired at most every x hours, the SQL service retrieves from the alert database/watch list the last time the rule fired for that user. Then, the rule subtracts that value from the current time, and stores the value as a last alert fired data item.

Finally, the original rule has the following conditions added:

```
"stock.last_stock_value > 40" and "stock.last_alert_fired >
    x."
```

These two exemplary approaches (doing correlation purely in memory and accessing a persistence layer) highlight the flexibility of the rules language. The same techniques can be used to leverage 3rd party database and persistence models.

A second example is the monitoring of an event by a "canned rule". In one embodiment of the invention, rules and watch lists can be combined to monitor the rate of change of an event. In this example, an alert is configured that calculates the rate of change and looks for missing or extra events in a regularly occurring event stream. An example of this type of alert is monitoring a "heartbeat" event. A first monitoring rule is established that triggers upon receipt of the designated heartbeat event. The event has a response, which is to update a watch list used as a counter. The watch list contains the last time the event triggered, a count of triggered events, and a moving average of the counter update interval. A second rule is used to monitor the watch list, and to generate a response when an event is missed (e.g. now( )−last time the event is triggered>threshold). A third rule is used to detect early triggering of the rule (e.g. the events coming too close together).

The above example illustrates an event updating a watch list that is monitored by several other events. This is an example of a set of complex rules that can be used. It should be noted that a set of rules and watch lists like the set described above can be packaged as a template and stored in a RuleBook. The packaging of the rules in this manner permits domain experts to write sets of arbitrarily complex rules and recipes and then publish them for use by a user community.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer system will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, can be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system can be specially constructed for the required purposes, or it can be a general-purpose computer selectively activated or configured by a computer program stored in the computer system. The processes presented above are not inherently related to any particular computer system or other computing apparatus. In particular, various general-purpose computer systems can be used with programs written in accordance with the teachings herein, or, alternatively, it can be more convenient to construct a more specialized computer system to perform the required operations.

A number of implementations of the invention have been described. Nevertheless, it will be understood that various modifications can be made without departing from the spirit and scope of the invention. Accordingly, other embodiments are within the scope of the following claims.

The invention claimed is:

1. A method executed in a computer system, for monitoring information events occurring in the computer system, the method comprising:
receiving by the computer system a first workspace definition, the first workspace definition including rules for accessibility of computer data in the first workspace by other workspaces;
automatically provisioning the first workspace with computer data responsive to the computer data meeting the rules in the first workspace definition, the computer data provisioned in the first workspace comprising data source information, access credentials for the data source and processing rules for processing data into event objects from the data source, wherein the data source information, access credentials and processing rules are not accessible by a second workspace;
binding the first workspace to a first hardware computing resource;
creating an event object in the first workspace with the computing resource and according to the data source information, access credentials and processing rules;
publishing the event object to an event queue accessible to the second workspace;
receiving by the computer system a definition for the second workspace definition, the second workspace definition including rules for processing the event objects accessible to the second workspace;
binding the second workspace to a second hardware computing resource; and
automatically processing the event objects in the second workspace with the second hardware computing resource according to the processing rules.

2. The method of claim 1 further comprising:
sharing the first workspace between more than one user.

3. The method of claim 1 wherein creating event objects by the first workspace with the first hardware computing resource is logically separate from the processing of event objects by the second workspace by the second hardware computing resource.

4. The method of claim 1 wherein binding the first workspace to a first hardware computing resource comprises establishing an amount of processor and memory provided to the first workspace.

5. The method of claim 1 wherein binding the second workspace to a second hardware computing resource comprises establishing an amount of processor and memory provided to the second workspace.

6. A computer-implemented system, comprising:
a processor for executing program code; and
a non-transitory computer-readable storage medium storing program code executable to perform steps comprising:
receiving a first workspace definition, the first workspace definition including rules for accessibility of computer data in the first workspace by other workspaces;
automatically provisioning the first workspace with computer data responsive to the computer data meeting the rules in the first workspace definition, the computer data provisioned in the first workspace comprising data source information, access credentials for the data source and processing rules for processing data into event objects from the data source, wherein the data source information, access credentials and processing rules are not accessible by a second workspace;
binding the first workspace to a first hardware computing resource;
creating an event object in the first workspace with the computing resource and according to the data source information, access credentials and processing rules;
publishing the event object to an event queue accessible to the second workspace;
receiving a definition for the second workspace definition, the second workspace definition including rules for processing the event objects accessible to the second workspace;

binding the second workspace to a second hardware computing resource; and automatically processing the event objects in the second workspace with the second hardware computing resource according to the processing rules.

7. The system of claim 6 further comprising program code executable to share the first workspace between more than one user.

8. The system of claim 6 wherein creating event objects by the first workspace with the first hardware computing resource is logically separate from the processing of event objects by the second workspace by the second hardware computing resource.

9. The system of claim 6 wherein binding the first workspace to a first hardware computing resource comprises establishing an amount of processor and memory provided to the first workspace.

10. The system of claim 6 wherein binding the second workspace to a second hardware computing resource comprises establishing an amount of processor and memory provided to the second workspace.

11. A non-transitory computer-readable storage medium containing program code, comprising program code for:

receiving a first workspace definition, the first workspace definition including rules for accessibility of computer data in the first workspace by other workspaces;

automatically provisioning the first workspace with computer data responsive to the computer data meeting the rules in the first workspace definition, the computer data provisioned in the first workspace comprising data source information, access credentials for the data source and processing rules for processing data into event objects from the data source, wherein the data source information, access credentials and processing rules are not accessible by a second workspace;

binding the first workspace to a first hardware computing resource;

creating an event object in the first workspace with the computing resource and according to the data source information, access credentials and processing rules;

publishing the event object to an event queue accessible to the second workspace;

receiving a definition for the second workspace definition, the second workspace definition including rules for processing the event objects accessible to the second workspace;

binding the second workspace to a second hardware computing resource; and automatically processing the event objects in the second workspace with the second hardware computing resource according to the processing rules.

12. The computer-readable storage medium of claim 11 further comprising program code for sharing the first workspace between more than one user.

13. The computer-readable storage medium of claim 11 wherein creating event objects by the first workspace with the first hardware computing resource is logically separate from the processing of event objects by the second workspace by the second hardware computing resource.

14. The computer-readable storage medium of claim 11 wherein binding the first workspace to a first hardware computing resource comprises establishing an amount of processor and memory provided to the first workspace.

15. The computer-readable storage medium of claim 11 wherein binding the second workspace to a second hardware computing resource comprises establishing an amount of processor and memory provided to the second workspace.

* * * * *